United States Patent [19]

Yoshimi et al.

[11] Patent Number: 5,589,279
[45] Date of Patent: *Dec. 31, 1996

[54] WELDABLE BLACK STEEL SHEET

[75] Inventors: Naoto Yoshimi; Toyofumi Watanabe; Masaaki Yamashita, all of Tokyo, Japan

[73] Assignee: NKK Corporation, Tokyo, Japan

[*] Notice: The term of this patent shall not extend beyond the expiration date of Pat. No. 5,387,473.

[21] Appl. No.: 290,675

[22] Filed: Aug. 15, 1994

Related U.S. Application Data

[63] Continuation of Ser. No. 856,245, Mar. 25, 1992, abandoned.

[30] Foreign Application Priority Data

Mar. 29, 1991 [JP] Japan .................. 3-089148

[51] Int. Cl.$^6$ .................................................. B32B 15/08
[52] U.S. Cl. ........................ 428/623; 428/626; 428/457
[58] Field of Search ........................ 8/685; 428/623, 428/626, 658, 659, 663, 457, 469, 621, 635

[56] References Cited

U.S. PATENT DOCUMENTS

| | | | |
|---|---|---|---|
| 3,928,292 | 12/1975 | Maeda et al. | 260/77.5 |
| 4,423,132 | 12/1983 | Kondo et al. | 430/67 |
| 4,948,678 | 8/1990 | Shindou et al. | 428/626 |
| 5,049,608 | 9/1991 | Medina | 524/375 |
| 5,059,492 | 10/1991 | Shindou et al. | 428/623 |
| 5,106,675 | 4/1992 | Ara et al. | 428/219 |
| 5,244,587 | 9/1993 | Ito et al. | 252/25 |
| 5,376,454 | 12/1994 | Sugasawa et al. | 428/421 |
| 5,378,291 | 1/1995 | Ara et al. | 148/251 |

FOREIGN PATENT DOCUMENTS

| | | |
|---|---|---|
| 55-30593 | 6/1980 | Japan . |
| 56-62996 | 7/1981 | Japan . |
| 58-193376 | 11/1983 | Japan . |
| 61-38276 | 12/1986 | Japan . |
| 62-263995 | 2/1987 | Japan . |
| 62-30262 | 3/1987 | Japan . |
| 62-89879 | 9/1987 | Japan . |

*Primary Examiner*—David A. Simmons
*Assistant Examiner*—Linda L. Gray
*Attorney, Agent, or Firm*—Nields & Lemack

[57] ABSTRACT

A black steel sheet having a sufficiently small coating thickness to allow the welding of the steel sheet, and yet exhibiting an excellently black surface, but also having high corrosion resistance, adhesive strength and formability. It is a steel sheet having a surface plated with zinc or zinc alloy, and carrying a chromate film formed on its plated surface, and a black film formed on the chromate film from a composition comprising specific proportions of a water-soluble or water-dispersible thermosetting resin and a water-soluble black dye, and having a sufficiently small thickness. The composition may further contain a solid lubricant, or a granular rust-inhibitive pigment, or both.

10 Claims, 3 Drawing Sheets

WELDABLE BLACK STEEL SHEET

This application is a continuation of application Ser. No. 07/856,245 filed Mar. 25, 1992, now abandoned.

FIELD OF THE INVENTION

This invention relates to a black steel sheet which is weldable and exhibits an excellent appearance having a black color, and which is, therefore, suitable for use in making electric appliances for domestic use, machines and furniture for office use, copying machines, automobiles, building materials, etc.

BACKGROUND OF THE INVENTION

Various fields of industry including those engaged in the manufacture of electric appliances for domestic use and machines and furniture for office use have recently come to use to a greater extent a weldable black steel sheet having an excellent appearance which can be obtained by the continuous and rapid treatment of a steel sheet plated with zinc or an alloy thereof. A great deal of research and development work has, therefore, been made to obtain such black steel sheets, and includes efforts made to obtain an effective method for the blackening treatment of a steel sheet, and an effective solution which can be used for such treatment.

The following is a summary of the methods which have hitherto been proposed for forming a black film on a steel sheet:

(a) A solution of a resin containing a black pigment, such as carbon black, is applied onto a steel sheet by e.g. spraying or roll coating to form thereon a film having a thickness of several tens of microns.

(b) A film existing on a steel sheet as a result of plating is caused to undergo reaction or electrolysis to develop a black film. This method includes a number of modes as will hereunder be set forth:

(1) A chromating solution containing Ag ions is used to form a black chromate film (as proposed in Japanese Patent Application Laid-Open No. 193376/1983);

(2) A black resin film composed mainly of carbon black is electrolyzed (Japanese Patent Application Laid-Open No. 62996/1981);

(3) A steel sheet which has been electroplated with a Zn—Co, Zn—Ni or Zn—Mo alloy is subjected to anodic treatment (Japanese Patent Publication No. 38276/1986);

(4) A steel sheet which has bee plated with a Zn—Ni alloy is subjected to dipping, spraying or anodic treatment with a solution containing nitric acid or a nitrate group to develop a black surface (Japanese Patent Publication No. 30262/1987);

(5) A black plated film is formed by cathodic treatment (e.g. Japanese Patent Application Laid-Open No. 263995/1987); and (6) Immersion plating is carried out on a surface plated with zinc or an alloy thereof to deposit thereon a metal having a nobler potential (e.g. Japanese Patent Application Laid-Open No. 89879/1987)

(c) A treating solution obtained by adding an organic dye to an aqueous solution of potassium sodium silicate is applied onto a surface plated with zinc or an alloy thereof to form a corrosion-resistant and closely adhering film thereon (Japanese Patent Publication No. 30593/1980).

All of these methods do, however, have their own drawbacks, as will hereunder be pointed out.

(a) This is a common method of coating used to form on a steel sheet a surface coating, consisting of a single layer and having usually a thickness of at least 10 microns. This thickness is too large to allow the welding of the steel sheet. The thickness of the film which allows the welding of the steel therethrough is from 0.2 to 3 microns. It is difficult to form a satisfactorily black film having a thickness not exceeding three microns, even if the solution may contain the black pigment, such as carbon black, at the maximum possible concentration. In other words, the use of any such blackening agent has been found unable to form any film that is satisfactorily black and yet keeps weldable the steel sheet on which the film has been formed.

(b) (1) The solution containing Ag ions is expensive. Moreover, this method spends as long a time as several tens of seconds in forming a black film and is, therefore, inapplicable to the continuous treatment of a strip which need be finished as rapidly as within five seconds.

(2) The black film made by this method is unsatisfactory in workability. Insofar as carbon black is a conductive pigment, the film is electrically conductive and is, therefore, low in corrosion resistance. Moreover, the film is unsatisfactory in blackness.

(3) and (4) These methods are both uneconomical, since they rely upon the dissolution of metal from the plated layer on the steel sheet. Moreover, the metal ions as dissolved from the plated layer deteriorate the solution for the blackening treatment and can present a serious problem to the continuous treatment. Furthermore, both of the methods have only a limited scope of application, i.e. (3) is applicable only to a steel sheet plated with a Zn—Co, Zn—Ni or Zn—Mo alloy, while (4) is applicable only to a sheet plated with a Zn—Ni alloy.

(5) The black film made by this method is unsatisfactory in formability.

(6) The black film which is formed by this method is unsatisfactory in adhesive strength, and is also low in corrosion resistance, insofar as a metal having a relatively noble or high potential is deposited on a metal having a relatively base or low potential (i.e. on zinc or an alloy thereof).

(c) this method is not intended for forming a film having an excellently black surface, nor is it intended for imparting weldability, insofar as the disclosure does not contain any specific reference to the film thickness. Moreover, as the film is basically composed of potassium sodium silicate, the hardened film is unsatisfactory in lubricating property as required during press forming, and is, therefore, unsuitable for any steel sheet that is used for making electrical appliances for domestic use, office machines or furniture, etc. Moreover, the disclosure does not specifically define the organic dye to be used. There are a very large number of organic dyes which are widely different from one another in various properties including quality of its color being unchangeable after a long exposure to light (light fastness), tinting strength and solubility in a solvent. Some dyes are superior to others in e.g. tinting strength, but inferior in light fastness. It is, therefore, needless to say that all of the organic dyes are not equally useful.

Under these circumstances, it is an object of this invention to provide a black steel sheet coated with a film which allows the welding of the sheet therethrough and yet exhibits an excellent black surface. The weldable black steel sheet of this invention is an improvement over the product of the known method as described at (a) above in which a black pigment, such as carbon black, is employed to form a black film. The steel sheet of this invention is, therefore, free from any of the problems encountered by the known methods relying upon reaction or electrolysis as described at (b) above, including the deterioration of the treating solution by the dissolved metal ions, the loss of the plating material, and the scope of application limited by the underlying plating material. Moreover, the steel sheet of this invention can be produced continuously and rapidly by using an existing continuous strip coating and baking line.

It is another object of this invention to provide a black steel sheet which is not only weldable and excellent in surface blackness, but also excellent in corrosion resistance, adhesive strength and formability.

Although the organic solvents have usually been used in a wide variety of coating compositions, the harmfulness of their vapor to the human body has turned out to be a big environmental problem. The latest tendency is, therefore, toward the use of an aqueous coating composition. Under these circumstances, it is still another object of this invention to provide a black steel sheet coated with a black film formed from an aqueous composition.

SUMMARY OF THE INVENTION

We, the inventors of this invention, have done an extensive range of research and experimental work to attain these objects, and particularly, to obtain a black film which has a thickness allowing the welding of the underlying steel sheet, and yet is comparable in blackness to any known black film. As a result, we have found that a weldable steel sheet having an excellent black surface can be produced if a black film having an appropriate thickness falling within a specific range is formed thereon from a composition obtained by mixing a base resin and a specific black dye in a specific ratio, and that it is possible to produce a weldable and excellently black steel sheet which is excellent in corrosion resistance, adhesive strength and formability, too, if a film having a specific multilayer structure including the black film is formed on the steel sheet, or if the composition further contains a specific component as required. Our discovery of these facts forms a basis for this invention.

This invention, therefore, resides essentially in a steel sheet having a surface plated with zinc or a zinc alloy, and carrying a chromate film formed on the plated surface, and a black film formed in an appropriate thickness on the chromate film from a composition comprising specific proportions of a water-soluble or -dispersible thermosetting resin and a water-soluble black dye, and further containing a specific additive or additives, if required.

The following is a more specific summary of this invention:

(1) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a water-soluble or -dispersible thermosetting resin as a base resin and 1 to 200 parts by weight of a water-soluble black dye as a blackening agent, the black film having a thickness of 0.3 to 3.0 microns.

(2) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a water-soluble or -dispersible thermosetting resin as a base resin, 1 to 200 parts by weight of a water-soluble black dye as a blackening agent and 1 to 100 parts by weight of a solid lubricant, and the black film having a thickness of 0.3 to 3.0 microns.

(3) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a water-soluble or -dispersible thermosetting resin as a base resin, 1 to 100 parts by weight of a water-soluble black dye as a blackening agent and 1 to 100 parts by weight of a granular rust-inhibitive pigment, and the black film having a thickness of 0.3 to 3.0 microns.

(4) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a water-soluble or -dispersible thermosetting resin as a base resin, 1 to 200 parts by weight of a water-soluble black dye as a blackening agent, 1 to 100 parts by weight of a solid lubricant and 1 to 100 parts by weight of a granular rust-inhibitive pigment, the black film having a thickness of 0.3 to 3.0 microns.

(5) A weldable black steel sheet as set forth at (1), (2), (3) or (4) above, wherein the water-soluble black dye is at least one dye selected from the group consisting of azo, azomethine, quinoline, ketoneimine, fluorone, nitro, xanthene, acenaphthene, qionophthalone, anthraquinone, aminoketone, methine, perylene, coumarin, perionone, triphenyl, triallylmethane, phthalocyanine, isochlorophenol and azine dyes.

(6) A weldable black steel sheet as set forth at (5) above, wherein the black dye is a mixture of a water-soluble black azo dye composed of a complex metal salt, and another water-soluble black dye.

(7) A weldable black steel sheet as set forth at (1), (2), (3) or (4) above, wherein the water-soluble black dye is a black azo dye composed of a complex metal salt.

(8) A weldable black steel sheet having a surface plated with zinc or a zinc alloy, and carrying a chromate film formed on the plated surface and having a coating weight of 10 to 200 mg/m$^2$ in terms of metallic chromium, and a black film formed on the chromate film from a composition comprising 100 parts by weight of a water-soluble or -dispersible thermosetting resin as a base resin, and 'x' parts by weight of a water-soluble black azo dye composed of a complex metal salt as a blackening agent, the black film having a thickness of 'y' microns, the 'x' being a value satisfying formulas 1 and 2, while the 'y' is a value satisfying formulas 1 and 3:

$(x-1)(Y-0.2) \geq 7$     (1)

$1 < x \leq 200$     (2)

$0.2 < y \leq 3$     (3)

where x represents the proportion, in parts by weight, of the dye against 100 parts by weight of the base resin, and y represents the thickness, in microns, of the black film.

(9) A weldable black steel sheet having a surface plated with zinc or a zinc alloy, and carrying a chromate film formed on the plated surface and having a coating weight of 10 to 200 mg/m² in terms of metallic chromium, and a black film formed on the chromate film from a composition comprising 100 parts by weight of a water-soluble or -dispersible thermosetting resin as a base resin, 1 to 100 parts by weight of a solid lubricant and 'x' parts by weight of a water-soluble black azo dye composed of a complex metal salt as a blackening agent, the black film having a thickness of 'y' microns, the 'x' being a value satisfying formulas 1 and 2, while the 'y' is a value satisfying formulas 1 and 3:

$$(x-1)(Y-0.2) \geq 7 \quad (1)$$

$$1 < x \leq 200 \quad (2)$$

$$0.2 < y \leq 3 \quad (3)$$

where x represents the proportion, in parts by weight, of the dye against 100 parts by weight of the base resin, and y represents the thickness, in microns, of the black film.

(10) A weldable black steel sheet having a surface plated with zinc or a zinc alloy, and carrying a chromate film formed on the plated surface and having a coating weight of 10 to 200 mg/m² in terms of metallic chromium, and a black film formed on the chromate film from a composition comprising 100 parts by weight of a water-soluble or -dispersible thermosetting resin as a base resin, 1 to 100 parts by weight of a granular rust-inhibitive pigment and 'x' parts by weight of a water-soluble black azo dye composed of a complex metal salt as a blackening agent, the black film having a thickness of 'y' microns, the 'x' being a value satisfying formulas 1 and 2, while the 'y' is a value satisfying formulas 1 and 3:

$$(x-1)(Y-0.2) \geq 7 \quad (1)$$

$$1 < x \leq 200 \quad (2)$$

$$0.2 < y \leq 3 \quad (3)$$

where x represents the proportion, in parts by weight, of the dye against 100 parts by weight of the base resin, and y represents the thickness, in microns, of the black film.

(11) A weldable black steel sheet having a surface plated with zinc or a zinc alloy, and carrying a chromate film formed on the plated surface and having a coating weight of 10 to 200 mg/m² in terms of metallic chromium, and a black azo film formed on the chromate film from a composition comprising 100 parts by weight of a water-soluble or -dispersible thermosetting resin as a base resin, 1 to 100 parts by weight of a solid lubricant, 1 to 100 parts by weight of a granular rust-inhibitive pigment and 'X' parts by weight of a water-soluble black azo dye composed of a complex metal salt as a blackening agent, the black film having a thickness of 'y' microns, the 'x' being a value satisfying formulas 1 and 2, while the 'y' is a value satisfying formulas 1 and 3:

$$(x-1)(Y-0.2) \geq 7 \quad (1)$$

$$1 < x \leq 200 \quad (2)$$

$$0.2 < y \leq 3 \quad (3)$$

where x and y are both as defined above.

(12) A weldable black steel sheet as set forth at (8) to (11), wherein the black film is formed from a composition comprising 'x' parts by weight of a water-soluble black azo dye composed of a complex metal salt as a blackening agent against 100 parts by weight of a base resin, and have a thickness of 'y' microns, said 'x' being a value satisfying formulas 1' and 2', while said 'y' is a value satisfying formulas 1' and 3':

$$(x-5)(y-0.65) \geq 6 \quad (1')$$

$$5 < x \leq 120 \quad (2')$$

$$0.65 < y \leq 2.5 \quad (3')$$

where x represents the proportion, in parts by weight, of the dye against 100 parts by weight of the base resin, and y represents the thickness, in microns, of the black film.

(13) A weldable black steel sheet as set forth at (2), (4), (5), (6), (7), (9), (11) or (12), wherein the solid lubricant is at least one material selected from the group consisting of hydrocarbon compounds such as polyolefin wax, fluororesins, fatty acid amides, metallic soaps, metal sulfides such as molybdenum disulfide, graphite, graphite fluoride, boron nitride and polyalkylene glycols.

(14) A weldable black steel sheet as set forth at (3), (4), (5), (6), (7), (10), (11), (12) or (13), wherein the granular rust-inhibitive pigment is at least one material selected from the group consisting of sparingly soluble chromium compounds and silica.

DETAILED DESCRIPTION OF THE INVENTION

Figure 1:
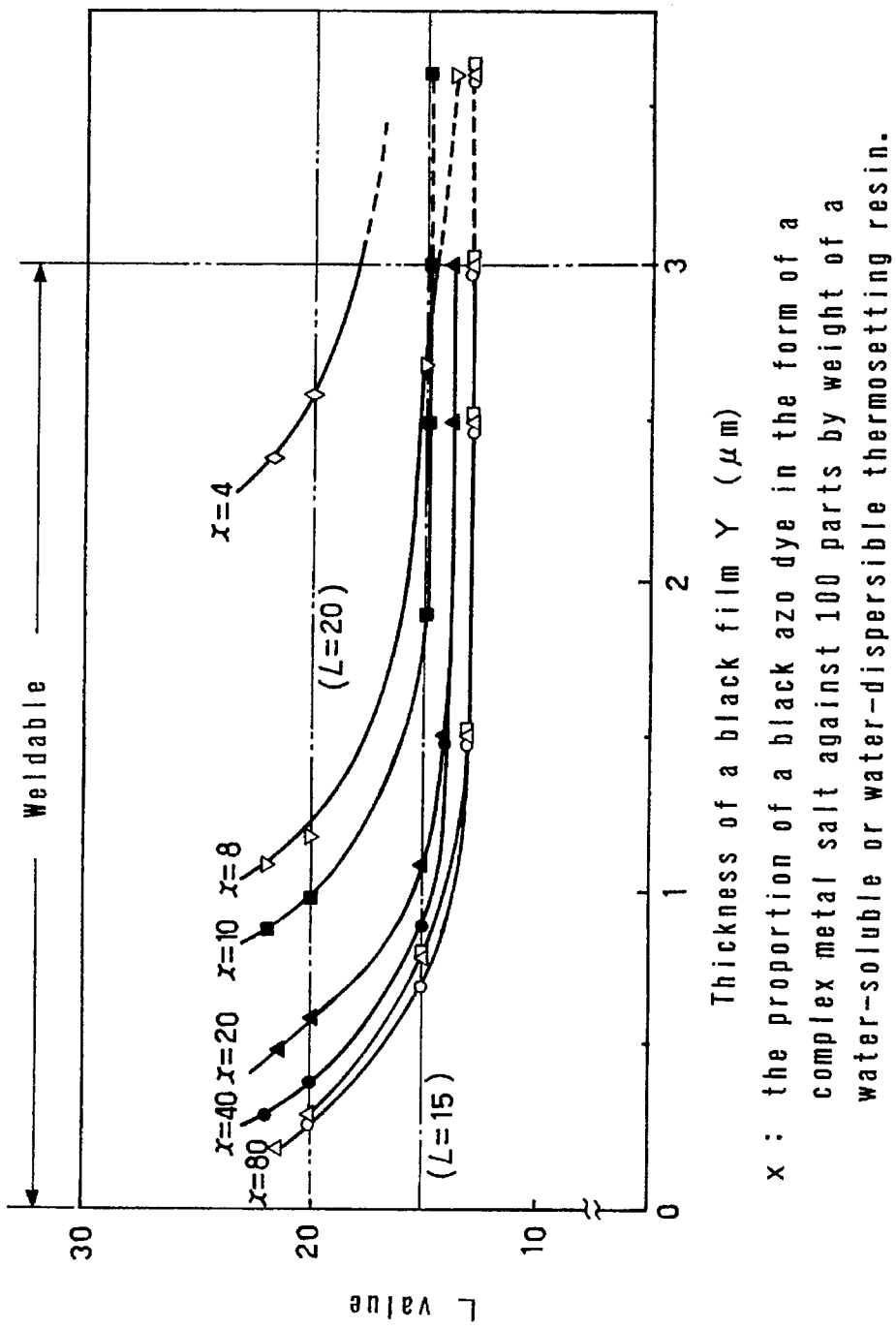
FIG. 1 is a graph showing the effect of the thickness, y, of a black film on its blackness (L value) in relation to the proportion, x, employed of a black azo dye composed of a complex metal salt.

The black steel sheet of this invention essentially comprises a steel sheet plated with zinc or a zinc alloy, as a starting material, a chromate film formed on its plated surface, and a black film formed on the chromate film from a composition comprising a water-soluble or -dispersible thermosetting resin and a water-soluble black dye.

The black dye which can be used for the purpose of this invention includes two types as classified by the chemical structure of the molecule, i.e. one which consists of a single kind of molecules and yet can give a black color, and a mixture of dyes which consist of molecules differing in chemical structure and can give a black color only when mixed.

The steel sheet used as the starting material is, for example, a steel sheet plated with zinc, an alloy of zinc and iron, an alloy of zinc and nickel, an alloy of zinc and manganese, an alloy of zinc and aluminum, an alloy of zinc, cobalt and chromium, or a similar plating composition further containing one or more elements such as Ni, Fe, Mn, Mo, Co, Al and Cr. It is also possible to use as the starting material a steel sheet coated with a layer formed from a composition similar to any of those mentioned above, but further containing, for example, a granular resin, silica, or a chromium compound. Moreover, the starting material may be a compositely plated steel sheet carrying a plating film formed by two or more layers of the same or different compositions, for example, a film formed by two or more layers consisting of Zn—Fe alloys having different iron contents, respectively.

As far as its blackness is concerned, a similar black film can be produced on any steel sheet, and even a hot or cold rolled steel sheet which has not been plated can, therefore, be used as the starting material. For the same reason, a stainless steel sheet, or a sheet of an aluminum or titanium alloy can be used as the starting material. From the standpoints of cost and corrosion resistance, however, it is desirable to use a steel sheet plated with zinc or a zinc alloy as the starting material, so that the black steel sheet of this invention may be used for making a final product to which no further painting need be given, for example, an electric appliance for domestic use.

Any practically possible method, such as an electrolytic, dip coating, or vapor phase process, can be employed for preparing the starting material.

A chromate film is formed on the surface of the starting material by chromate treatment. The combination of the chromate film and a black film containing a specific blackening agent as will hereinafter be described gives a very high level of corrosion resistance to the black steel sheet of this invention.

The chromate film is so formed as to have a dry coating weight of 10 to 200 mg/m$^2$, preferably 30 to 80 mg/m$^2$, in terms of metallic chromium. If its coating weight exceeds 200 mg/m$^2$, it is likely to lower the workability and weldability of the steel sheet. If its coating weight is smaller than 10 mg/m$^2$, it is likely to lack uniformity and lower the corrosion resistance of the steel sheet. The chromate film preferably contains chromium having a valence of 6, since chromium ions having a valence of 6 have a self-healing action and prevent corrosion occurring from any surface defect on the steel sheet.

The chromate treatment for forming the chromate film can be carried out by any known process relying upon reaction, coating or electrolysis.

If a coating type of process is employed for the chromate treatment, it is carried out by employing a coating solution which consists mainly of a partially reduced chromic acid solution and may further contain a water-dispersible or -soluble organic resin, such as an acrylic resin, and/or silica (colloidal or fumed) having a particle diameter of several to several hundred millimicrons. The solution may contain chromium ions having a valence of 3 and ones having a valence of 6 in a ratio of 1:1 to 1:3, and have a pH of 1.5 to 4.0, preferably 2 to 3. The ratio of the chromium ions having a valence of 3 to those having a valence of 6 is adjusted by employing a commonly used organic reducing agent selected from among, for example, saccharides and alcohols, or a commonly used inorganic reducing agent. The coating type of chromate treatment may be carried out by any commonly used method, such as roll coating, dipping, or spraying. The treatment is not followed by water rinsing, but is directly followed by drying to give a chromate film, since rinsing results in the removal of chromium ions having a valence of 6. The film contains chromium ions having valences of 3 and 6 in the ratio in which the solution contains them. A resin film, which will be formed on the chromate film, prevents any excessive flow of chromium ions having a valence of 6 out of the chromate film in a corrosive environment and enables the maintenance of effective passivation and thereby high corrosion resistance for a long period of time.

An electrolytic type of chromate treatment includes cathodic treatment in a bath comprising chromic anhydride and one or more kinds of anions selected from among, for example, sulfuric acid, phosphoric fluoride and halogenoxy acids, and is followed by rinsing in water and drying to give a chromate film.

The chromate film which is formed by the coating type of process contains a larger amount of chromium having a valence of 6 than that formed by the electrolytic process, and is, therefore, superior in corrosion resistance. The corrosion resistance of the former film becomes still better upon heat treatment, which improves its density and strength, as will hereinafter be described in further detail. The chromate film which is formed by the electrolytic process has the advantages of being high in density and strength even without being given heat treatment, and of being easy to control in coating weight. The film formed by the coating type of process is, however, preferred from the standpoint of corrosion resistance.

Description will now be made of the black film formed on the chromate film and its components. According to this invention, the black film is principally characterized by comprising a water-soluble or -dispersible thermosetting resin as a base resin, and a water-soluble black dye as a blackening agent. The film may further contain a solid lubricant which is added to improve its workability, or a rust-inhibitive pigment added to improve its corrosion resistance, or both.

In the following description, the blackness of a black film will be judged by its lightness, or L value. The smaller the L value of a film, the better its blackness is. According to this invention, the black film is intended to have an L value not exceeding 25, preferably not exceeding 20, and more preferably not exceeding 15. The L values which are herein stated were measured by a multiple light source spectrophotometer manufactured by Suga Shikenki Kabushiki Kaisha (Model MSC).

It is essential that the blackening agent which is employed to form the black film be capable of giving a satisfactorily high degree of blackness when the film has a thickness allowing the welding of the underlying steel sheet, i.e. not exceeding three microns. Moreover, it is imperative for the blackening agent not to exert any adverse effect on any other property required of the black film, such as workability or corrosion resistance, when it is mixed with the base resin in a ratio ensuring that the film exhibit a satisfatorily high degree of blackness.

The coloring agents which are generally in use can be classified into three major types, i.e. inorganic pigments, organic pigments, and dyes. When an inorganic or organic pigment is used in a coating film having a Small thickness not exceeding several microns, its hiding power has a critical bearing on the blackness of the film. Carbon black is a typical inorganic pigment used as a blackening agent. As it is, for example, inexpensive, carbon black is used more often than any other blackening agent, and is commercially available in a wide variety of grades for a wide range of application. Carbon black, however, fails to exhibit a sufficiently high hiding power for achieving a satisfactorily high degree of blackness in any film having a thickness not exceeding three microns, as intended by this invention, through its hiding power may be sufficient for an ordinary coating film having a thickness in the order of as large as several tens of microns. Moreover, carbon black is an electrically conductive pigment, and forms, therefore, an electrically conductive black film which lowers the corrosion resistance of the steel sheet on which the film has been formed. No other black inorganic pigment, such as iron oxide or titanium black, can form a satisfactorily black film, either.

Aniline Black is a typical black organic pigment, but has too low a hiding power to form a satisfactorily black film. Another black organic pigment known as Perylene Black is also incapable of forming a satisfactorily black film.

No combination of two or more organic or inorganic pigments has been found capable of achieving a satisfactorily high level of blackness, either.

It is understood that there are commercially available thousands of dyes as counted by tradenames. They are classified by two major methods, i.e. (1) one classifying the dyes by the chemical structure thereof, and (2) one for the practical classification of the dyes based on their properties (see e.g. "Handbook of Organic Chemistry", compiled by The Society of Organic Synthetic Chemistry, and published by Gihodo).

The method as stated at (1) above classifies the dyes by the chemical group in the molecule which gives rise to color. The dyes as classified by this method include nitroso, nitro, azo (monoazo, disazo, trisazo and tetrakisazo), anthraquinone, indigo, azine, cyanine, phthalocyanine, stilbene, sulfur, triazole, triphenylmethane, acridine, diphenylmethane, and oziazine dyes.

According to the method as stated at (2) above, the dyes are classified into e.g. direct, acid, basic, acid mordant, premetallized, sulfur, vat, azoic disperse, reactive, oxidation, fluorescent brightener, and oil-soluble (organic solvent-soluble) dyes.

It follows from these two ways of classification that, for example, the acid dyes according to the classification by the method (2) include azo (monoazo, disazo, trisazo and tetrakisazo), anthraquinone, triphenylmethane, and azine dyes according to the classification by the method (1).

The color of a dye as the most important property thereof is due to the action of a chemical group containing an unsaturated bond, such as —CH=CH—, or —N=N(chromophore), and a group containing a lone pair of electrons, such as —NH$_2$ or —OH (auxochrome), whereby, while light having a particular-wavelength is absorbed, light having a different wavelength not causing absorption is visible to the eye as the color of the dye. Thus, there are various dyes having a variety of colors. These colors are yellow, orange, red, violet, blue, green, brown and black according to the classification by the Color Index.

The Color Index (Third Edition, Vols. 1 to 8) published by The Society of Dyers and Colourists and American Association of Textile Chemists and Colourists describes the commercially available dyes by class, structure, properties, use, etc., and classifies the dyes under "C.I. Generic Name".

The Color Index classifies the commercially available dyes in a practically useful way similar to that of classification by the method as stated at (2) above, and gives the classification of the colors which includes the classification of the dyes by the chemical structure in a numerical order starting with 1. If the chemical structural formula of a dye is specifically known, it is shown under "C.I. Constitution Number", and the majority of the dyes of which the chemical structural formulas are not clear are classified by chemical structure as, for example, azo (monoazo, disazo, etc.), anthraquinone, and azine dyes, as is the case with the classification by the method stated at (1) above.

For example, the black dyes belonging to the class of acid dyes are grouped under the classification "C.I. Acid Black" which includes "C.I. Acid Black 1" covering disazo dyes having a specific chemical structure, "C.I. Acid Black 2" covering azine dyes having a specific chemical structure, and "C.I. Acid Black 3" covering disazo dyes having another chemical structure, and classifies the dyes by color, properties, use, etc. The "C.I. Generic Name" provides a listing of dyes by the names under which they are commercially available.

We have examined the black dyes belonging to every class of dyes to see whether each dye satisfies the requirements connected with the manufacture and use of the steel sheet according to this invention. The requirements are:

(1) That the dye is soluble or dispersible in a base resin (thermosetting resin) and a solvent (water, or an organic solvent), and does not change in color when a film containing it is baked for thermal setting;

(2) That the dye enables the formation of a satisfactorily black film having a small thickness allowing the welding of the underlying steel sheet, i.e. not exceeding three microns; and (3) That the color of the dye does not fade even in a film which is likely to be exposed to light from various sources, as one formed on a steel sheet used to make electrical appliances for domestic use, office machines or furniture, etc., i.e. the dye has good fastness to light.

It is only the black dyes satisfying all of these three requirements that can be used to make the black steel sheet of this invention.

We have found that a mixture of a water-soluble black dye and a water-soluble or -dispersible thermosetting resin can form a film having a sufficiently small thickness to allow welding, i.e. not exceeding three microns, and yet exhibiting a high level of blackness.

The water-soluble dye generally contains —OH, —COOH, —SO$_3$H, —NH$_2$ or another hydrophilic group at the end of its molecule. All the dyes according to the classification as described at (2) above, except the oil-soluble (organic solvent-soluble) dyes, are, therefore, water-soluble dyes.

It is, however, to be understood that this invention does not preclude the use of a water-soluble dye not registered in the Color Index, such as a new dye yet to be registered in the Color Index, or a mixture of different water-soluble dyes.

The water-soluble black dye which can be used for the purpose of this invention is, for example, an azo, azomethine, quinoline, ketoneimine, fluorone, nitro, xanthene, acenaphthene, quinophthalone, anthraquinone, aminoketone, methine, perylene, coumarin, perinone, triphenyl, triallylmethane, phthalocyanine, isochlorophenol or azine dye if it is classified in accordance with the classification as described at (1) above. It is also possible to use a mixture of two or more such dyes.

The black dyes are grouped as "Black" in the Color Index. It is, however, possible to form a black film by mixing, for example, yellow, red and violet dyes in accordance with the known subtractive process. The black dye which can be used for the purpose of this invention is not only one which consists of a single kind of molecules and yet gives a black color, but also includes a mixture of dyes having different molecular structures which give a black color when mixed, as hereinabove stated. Therefore, it is possible to use any black dye obtained by mixing dyes of the same or different classes in accordance with the subtractive process.

The black azo and azine dyes are, among others, suitable from the standpoints of economy and blackness.

As a result of our further research, however, we have discovered that the use of a water-soluble azo dye in the form of a complex metal salt enables the formation of a black film which is superior in blackness, light fastness and corrosion resistance to any film formed by employing any other type of dye. This type of dye is characterized by:

(1) its superiority to any other dye in stability (or fastness) to light, apparently because it is a complex compound formed by two molecules of an azo dye and one atom of a metal (a complex metal salt of the 2:1 type), or by one molecule of an azo dye and one atom of a metal (a complex metal salt of the 1:1 type); and (2) its superiority to any other dye in blackness.

It is chromium that is mainly used to form a complex salt with a dye, though other metals, such as Co, Cu, Fe and Al, can also be used for that purpose.

The black azo dyes in the form of complex metal salts include acid, direct and mordant dyes as listed below:

(1) C.I. Acid Black: 8, 43, 49, 51, 52, 52: 1, 53, 55, 57, 60, 63, 65, 71, 82, 84, 92, 98, 99, 107, 108, 114, 115 118, 119, 120, 121, 122, 124, 129, 132, 133, 134, 135, 136, 137, 138, 139, 140, 147, 148, 149, 150, 151, 153, 154, 155, 157, 158, 159, 164, 165, 168, 170, 171, 172, 174, 176, 178, 180, 181, 183, 184, 185, 187, 188, 192, 194, 195, 198, 199, 207, 211, 213, 215, 216, 217, 218, 220, 222, 223, 225, 226 and 227'

(2) C.I. Direct Black: 57, 109, 116, 130, 142, 143 and 144; and (3) C.I. Mordant Black: 90.

It is, of course, possible to use also any other black azo dye in the form of a complex metal salt that is not registered in the Color Index, such as a new product yet to be registered, or a mixture of dyes which contains at least one black azo dye in the form of a complex metal salt, as hereinbefore stated.

The use of any such black azo dye in the form of a complex metal salt enables the formation of a uniformly and excellently black film having a sufficiently small thickness to allow welding, i.e. a thickness not exceeding three microns. Moreover, the high light fastness of the dye itself permits it to be used without presenting any problem in forming a black film which will be exposed to light from various sources, as one formed on a steel sheet used to make electric appliances for domestic use, office machines or furniture, etc.

A water-soluble black azine dye and a water-soluble black azo dye which is not a complex metal salt are superior to a black mordant dye, etc. in light fastness, but are inferior to any black azo dye that is a complex metal salt. They have, however, the advantage of being about 20 to 50% less expensive than any water-soluble black azo dye in the form of a complex metal salt, and thereby enabling the formation of a black film which is less expensive.

The black film according to this invention which contains a black dye has a high level of corrosion resistance, as hereinabove stated, and its corrosion resistance is by far higher than that of any conventional black film containing a pigment as a blackening agent. This is apparently due to the facts:

(i) That the black dye is electrically nonconductive:

(ii) That the dye itself forms a passive film, as its molecules are uniformly and densely distributed in the black film; and (iii) That the uniformly and densely distributed molecules of the dye prevent penetration of ions through the film and thereby improve its barrier effect.

The corrosion resistance of the steel sheet according to this invention owes itself primarily to the barrier effect produced by the chromate forming a passive film by virtue of chromium ions having a valence of 3 and the barrier effect of the resin film, and is further improved by the barrier effect of the dye itself as hereinabove stated. Other factors contributing to its high corrosion resistance include the self-healing action which is achieved by the conversion of chromium ions having a valence of 6 in the chromate to ones having a valence of 3 and rectifies any defect of the passive film, and the high adhesive strength achieved between the zinc or zinc alloy layer and the chromate film, and between the chromate film and the black film.

The use of a dye composed of a complex chromium salt, among others, enables a very high level of corrosion resistance, presumably by virtue of the synergistic effect produced by the trivalent chromium ions in the salt and the underlying chromate, as will be obvious from EXAMPLE 6. It is apparent that the dye containing trivalent chromium forms a stable passive film showing a greatly improved barrier effect. Therefore, the most preferable form of the dye for the purpose of this invention is a complex salt containing trivalent chromium ions.

A water-soluble dye can be easily dissolved in water, and form a black film-forming composition if it is mixed with a water-soluble or -dispersible thermosetting resin. The dye composition can form a uniformly and excellently black film having a sufficiently small thickness to allow welding, i.e. a thickness not exceeding three microns.

The manufacture of the steel sheet according to this invention is also free from any such problem caused by the deterioration of the bath used for treatment as has hitherto been encountered by etching type of blackening treatment, or blackening treatment relying upon reaction, such as electrolytic treatment or substitution plating. The black steel sheet of this invention avails itself of the most important advantage of the coating type of treatment, i.e. can be produced from any type of plated steel sheet irrespective of the material used for its plating.

The minimum allowable proportion of the water-soluble black dye to the water-soluble or -dispersible thermosetting resin in the composition for forming the black film on the steel sheet of this invention, and the minimum allowable thickness of the black film are both dependent upon the intended blackness of the steel sheet, and are correlated to each other.

The following is a description of the relation which we have experimentally found between the proportion 'x' (parts by weight) of a water-soluble black azo dye in the form of a complex metal salt for 100 parts by weight of a water-soluble or -dispersible thermosetting resin and the thickness 'y' (microns) of a black film.

Reference is first made to FIG. 1 showing the effect which the thickness 'y' (microns) of the black film has experimentally been found to exert on its blackness (L value), in relation to the proportion 'x' (parts by weight) of the black dye. As is obvious from it, we have found that, while an increase in the value of x generally enables a lowering of the minimum allowable value of y, no desired blackness can be achieved unless the value of y is larger than 0.2 (preferably larger than 0.65), however large the value of x may be, and that, while an increase in the value of y generally enables a lowering of the minimum allowable value of x, no desired blackness can be achieved unless the value of x is larger than 1 (preferably larger than 5), however large the value of y (or the thickness of the film) may be.

The maximum allowable of the thickness 'y' (microns) of the black film is limited from a weldability standpoint. It is $$y \leq 3 \quad (3)$$

and preferably $$y \leq 2.5 \quad (3')$$

No film having a thickness 'y' in excess of three microns, or even in excess of 2.5 microns, is suitable, as it disables the satisfactory passage of a welding current.

The maximum allowable of the proportion 'x' (parts by weight) of the black dye for 100 parts by weight of the resin is limited from a formability standpoint. It is $$x \leq 200 \quad (2)$$

and preferably $$x \leq 120 \quad (2')$$

No proportion 'x' in excess of 200 parts by weight, or even in excess of 120 parts by weight, is suitable, as the resulting film is very likely to peel off any bent or otherwise formed portion thereof.

Figure 2:
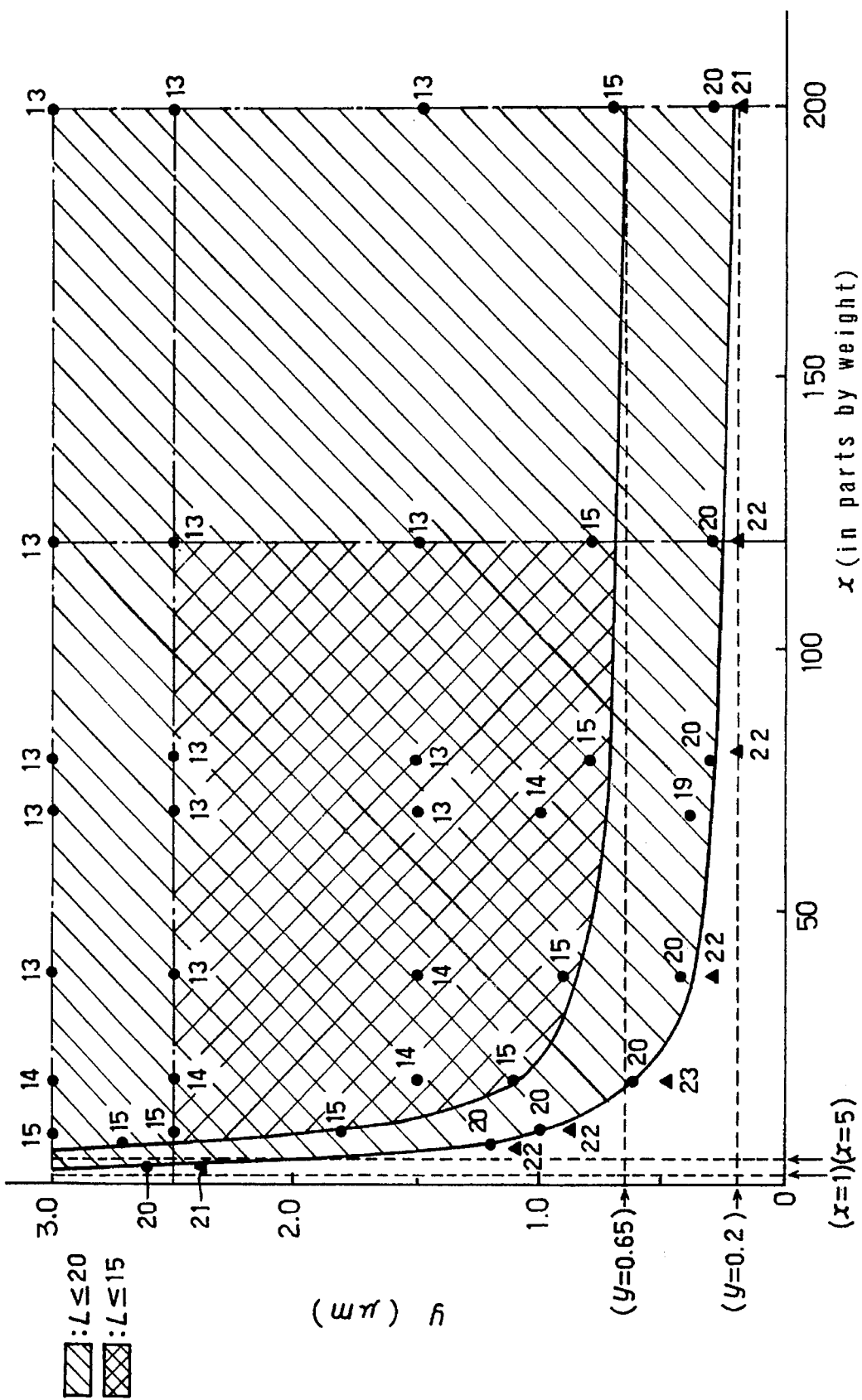
FIG. 2 is a graph showing the ranges of the proportion, x, of the black azo dye composed of a complex metal salt and the thickness, y, of the black film which give the film the desired blackness (L value)

We have studied the relation between the values of x (parts by weight) and y (microns), and obtained the results as shown in FIG. 2. As is obvious from it, we have found that, if the intended blackness is of a level as represented by an L value not exceeding 20, the following relationship need exist:

$$(x-1)(y-0.2) \geq 7 \quad (1)$$

where x>1, and y>0.2;
and that, if it is of a preferred level as represented by an L value not exceeding 15, the following relationship need exist:

$$(x-5)(y-0.65) \geq 6 \quad (1')$$

where x>5, and y>0.65.

Therefore, the black film on the steel sheet of this invention is required to satisfy the following relationship:

$$(x-1)(y-0.2) \geq 7$$

where $1 < x \leq 120$, and $0.2 < y \leq 3$ and preferably $$(x-5)(y-0.65) \geq 6$$

where $5 < x \leq 120$, and
$0.65 < y \leq 2.5$.

FIG. 2 shows the ranges of x and y as defined above.

The base resin used to form the black film on the steel sheet of this invention is a thermosetting resin which is soluble or dispersible in water. These limitations are important for the reasons which will hereinafter be set forth. The resin need be one which is soluble or dispersible water, since the black dye is a water-soluble one. The resin need be a thermosetting one, since the use of a thermoplastic resin is likely to result in a black film which is low in scratch resistance.

Specific examples of the applicable thermosetting resins which are soluble or dispersible in water are acrylic copolymer, alkyd, epoxy, polybutadiene, phenolic, and polyurethane resins. It is also possible to use a mixture of two or more such resins, a product of addition condensation formed by any such resin and another monomer, or a derivative of any such resin obtained by modification with another resin. Acrylic copolymer, alkyd, and epoxy resins are, among others, preferred.

The acrylic copolymer resins are ones which can be synthesized from ordinary unsaturated ethylenic monomers by e.g. solution, emulsion or suspension polymerization. This type of resin is obtained by employing as an essential component a hard monomer such as methacrylate, acrylonitrile, styrene, acrylic acid, acrylamide or vinyltoluene, and adding an appropriate proportion of an unsaturated vinyl monomer to impart hardness, flexibility and crosslinking property to the resulting resin. The resin may be modified by another kind of resin, such as an alkyd, epoxy, or phenolic resin.

As regards the alkyd resins, it is possible to use any of the known ones which can be produced by ordinary methods, for example, oil-modified, rosin-modified, phenyl-modified, styrenated, silicone-modified, and acryl-modified alkyd resins, and oilfree alkyd (polyester) resins.

Examples of the suitable epoxy resins are straight epoxy resins of e.g. the epichlorohidrin or glycidyl ether type, and fatty acid-modified, polybasic acid-modified, acrylic resin-modified, alkyd-(or polyester-)modified, polybutadiene-modified, phenol-modified, amine- or polyamine-modified, and urethane-modified epoxy resins.

A known curing agent is used with the resin. Examples of the appropriate curing agents are melamine, block isocyanate, and urea.

The black film formed on the steel sheet of this invention as hereinabove described possesses all of the necessary properties. The addition of certain additives as will hereinafter be described, however, makes it possible to form a film having still better properties.

Firstly, it is preferable to add a solid lubricant to a film-forming composition to form a black film having good self-lubricating property. The following is a list of examples of the solid lubricants which are appropriate for the purpose of this invention:

(a) Hydrocarbon lubricants, such as natural and synthetic paraffins, microcrystalline wax, polyethylene wax, and chrolinated hydrocarbons;

(b) Fluororesins, such as polyfluoroethylene, polyvinyl fluoride, polytetrafluoroethylene, and polyvinylidene fluoride resins;

(c) Fatty acid amide lubricants, such as stearic acid amide, palmitic acid amide, methylenebisstearoamide, ethylenebisstearoamide, oleic acid amide, ethyl acid amide, and alkylenebis fatty acid amide;

(d) Metallic soaps, such as calcium stearate, lead stearate, calcium laurate, and calcium palmitate;

(e) Metal sulfides, such as molybdenum disulfide, and tungsten disulfide; and (f) Other lubricants, such as graphite, graphite fluoride, boron nitride, grease, and alkali metal sulfates.

The solid lubricant is used in the proportion of 1 to 100 parts by weight, preferably 3 to 60 parts by weight, for 100 parts by weight of thermosetting resin. If its proportion is less than one part, or even 3 parts, by weight, it does not satisfactorily improve the lubricating property of the black film. The use of the lubricant in any proportion in excess of 100 parts, or even 60 parts, by weight, is undesirable, since it lowers the strength of the black film as cured, and causes it to adhere partly to a die used for pressing the steel sheet.

The black film formed from a coating composition comprising a water-soluble or -dispersible base resin and a water-soluble black dye has a satisfactorily high level of corrosion resistance by virtue of the synergistic effect produced by the underlying plating layer and the chromate film. It is, however, preferable to add a rust-inhibitive pigment to the composition to form a film which exhibits a still higher level of corrosion resistance particularly when subjected to working, and thereby provides a black steel sheet having a widened scope of application.

It is possible to use as the rust-inhibitive pigment one or more materials selected from among sparingly soluble chromates and silica. The sparingly soluble chromates are barium chromate (Ba $CRO_4$), strontium chromate (Sr $CrO_4$), lead chromate ($PbCrO_4$), zinc chromate ($ZnCrO_4 \cdot 4Zn(OH)_2$), calcium chromate ($CaCrO_4$), potassium zinc chromate ($K_2O \cdot 4ZnO \cdot 4CrO_3 \cdot 3H_2O$), and silver chromate ($AgCrO_4$). Any such silica is stable when dispersed in the base resin.

The followings are the examples of silica used in this invention:

(1) Silica by pyrogenic process (such as AEROSIL 130, AEROSIL 200, AEROSIL 300, AEROSIL 380, etc. by commercial names of Nippon Aerosil Co., Ltd.);

(2) Colloidal silica (such as Snawtex 20, Snawtex C, Snawtex N, Snawtex O, Snawtex S, etc. by commercial names of Nissan Chemical Industries, Ltd.);

(3) Silica by wet process-precipitated type (such as T-32(S), K-41, F-80, etc. by commercial names of TOKUYAMA SODA Co., Ltd.);

(4) Silica by wet-gel process (such as SYLOID 244, SYLOID 150, SYLOID 72, SYLOID 65, SHIELDEX, etc. by commercial names of Fuji-Davison Chemical Ltd.). It is possible to use silica by mixing one or more kind of the above-mentioned.

One or more rust-inhibitive pigments are incorporated as one of the constituents of the film-forming composition. The rust-inhibitive pigment is used in the proportion of 1 to 100 parts, preferably 3 to 60 parts, by weight for 100 parts by weight of thermosetting resin. If its proportion is less than one part by weight, it does not exhibit any rust inhibiting effect. The use of the pigment in any proportion exceeding 100 parts by weight should be avoided, as it gives rise to a color other than black, and results in an unsatisfactorily black film. For example, the yellow sparingly soluble chromates reduce the blackness.

The addition of both the solid lubricant and the granular rust-inhibitive pigment enables the formation of a black film which is outstanding good in both formability and corrosion resistance on any formed steel sheet portion. In this case, they are each used in the proportion of 1 to 100 parts, preferably 3 to 60 parts, by weight for 100 parts by weight of base resin.

Moreover, another black pigment (inorganic or organic), or black dye can be added to form a black film having its color tone and luster controlled exquisitely as desired.

For example, the addition of carbon black, which is a black inorganic pigment, makes it possible to control the luster or blackness of the film. The addition of a color pigment or dye for producing a color other than black makes it possible to obtain an exquisitely modified black color, such as reddish or bluish.

The black film as hereinabove described can be formed if the composition which has been diluted with water as required is applied in an appropriate film thickness onto a steel sheet by e.g. roll squeezing or coating, or air-knife coating, and is baked by heating the sheet to a temperature of 80° C. to 300° C., preferably 120° C. to 250° C. Any ordinary method can be employed without any limitation in particular for the application and baking of the composition. It is, however, a great advantage of the steel sheet according to this invention that it can be manufactured by any coating equipment that iron and steel manufacturers usually have for producing high corrosion resistance surface treated steel sheets.

As is obvious from the foregoing, this invention provides a black steel sheet which is weldable, since its black film has a thickness not exceeding three microns, which is smaller than that of the black film on any conventionally available steel sheet, and yet which has an excellently black surface. The black steel sheet of this invention is a product which is excellent in both various properties and productivity. In addition to its excellent blackness and weldability, it is outstandingly characterized by the high adhesive strength, workability, corrosion resistance and light fastness of its black film. This particularly the case when the black film contains a water-soluble black azo dye in the form of a complex metal salt. As it can be manufactured by any existing coating and baking equipment including a roll coater, its manufacture can be accomplished by a process of greatly improved productivity which is free from any problem as has hitherto been caused by the deterioration of the coating solution by the dissolution of the plating layer on any conventional black steel sheet made by reactive etching.

The black film on the steel sheet of this invention is formed from a composition containing an aqueous solvent, and is, therefore, unlikely to exert any such adverse effect on the human body as may be produced by any film formed from a composition containing an organic solvent.

EXAMPLES

The invention will now be described more specifically with reference to EXAMPLES 1 to 6 each directed to a steel sheet used for making an electrical appliance for domestic use, or office machine or furniture, as well as COMPARATIVE EXAMPLES 1 to 6 corresponding to EXAMPLES 1 to 6, respectively.

Each steel sheet had a surface which had been electroplated with a Zn—Ni alloy having a nickel content of 12%, or a Zn—Fe alloy having an iron content of 25%. After it had been degreased with an alkali, rinsed with water, and dried, it was coated with a chromate solution by a roll coater, or was electrolyzed in an electrolytic bath for chromate treatment, whereby a chromate film was formed on the plated surface of the steel sheet. After it had been dried, the film was coated with a resin solution by a roll coater. The resin film was dried, heated, and air cooled.

More specifically, the coating type of chromate treatment and the electrolytic chromate treatment were carried out, as will be described below:

Coating type of chromate treatment:

The chromating solution contained chromium ions having a valence of 3 and ones having a valence of 6 in the ratio of 2:3, and had a pH of 2.5 (after adjustment by KOH), and a solid content of 20 g per liter. The solution was applied by the roll coater onto the steel surface at ordinary room temperature, and dried.

Electrolytic chromate treatment:

The bath contained 50 g of $CrO_2$ and 0.5 g of $H_2SO_4$ per liter, and had a temperature of 50° C. The film was formed by cathodic treatment using a current density of 4.9 A/dm$^2$ and an electrolyzing time of 20 seconds, followed by rinsing with water and drying.

TABLES 1 to 5 show the modes of plating applied on the steel sheets, and the details of the base resins, blackening agents, solid lubricants, and granular rust-inhibitive pigments used for preparing the black film compositions, as employed in the EXAMPLES of this invention and the COMPARATIVE EXAMPLES. TABLES 6 to 33 show the plated steel sheets employed, the chromate films formed thereon, the compositions used for forming black films thereon, and the results of the test conducted on the black steel sheets obtained. The compositions were prepared by mixing the constituents thereof as shown in TABLES 2 to 5 in the proportions as shown in TABLE 6 and so on, and were diluted with solvent as required.

The following is a description of the tests conducted for the evaluation of each black steel sheet:

(1) Blackness:

The multiple light source spectrophotometer (Model MSC) of Suga Test Instruments Co., Ltd. was used to determine the L value of the black film on each steel sheet as a measure of its blackness. The symbols used to show the results of evaluation in the relevant tables have the following meanings, respectively:

⊚: L≦15;

○+: 15<L≦20;

○: 20<L≦25;

x: L>25.

(2) Weldability:

Spot welding was conducted on each steel sheet and the number of continuously formed weld spots was counted as a measure of its weldability.

Spot Welding Conditions:

Electrode: Cr—Cu, D type;

Electrode dia.: 6 mm;

Welding current: 10 kA;

Welding pressure: 200 kg;

Welding time: 12 cycles/60 Hz.

The symbols used to show the results in the relevant tables have the following meanings;

⊚: 1000 or more spots;

○: 700 or more spots;

x : Less than 700 spots.

(3) Corrosion resistance of flat and formed portions:

A salt spray test conforming to the requirements of JIS-Z-23 71 was conducted for a maximum of 480 hours on a flat portion of each black steel sheet and an extruded portion formed by an Erichsen tester and having a height of 7 mm. The corrosion resistance of each tested portion was judged by the length of time which had passed before white rust formed in 5% by area of its surface. The symbols used to show the results have the following meanings:

⊚: No white rust formed;

+○: Over 240 hours, but within 480 hours;

○: Over 120 hours, but within 240 hours;

−○: Over 72 hours, but within 120 hours;

Δ: Over 24 hours, but within 72 hours;

x : Within 24 hours.

(4) Adhesive strength of black film:

One hundred squares defining a checkered pattern and having a distance of 1 mm from one another were cut in the black film on each steel sheet, and an adhesive tape was bonded to, and removed from, the checkered surface to see how the black film would peel off the steel sheet. The symbols used to show the results have the following meanings:

⊚: No peeling occurred;

○: Peeling occurred to less than 10% by area of the film;

Δ: Peeling occurred to from 10%, inclusive, to less than 20%, by area;

x: Peeling occurred to 20% or more by area.

(5) Formability:

A specimen of each black steel sheet was subjected to hat-drawing, by 10 mm-extrusion through a 5 mmØ– die with a 120 mmØ– blank, and an adhesive tape was bonded to, and removed from, the drawn portion of the black film to determine how the film would peel off the steel sheet and adhere to the tape, and change in appearance. The symbols used to show the results have the following meanings:

⊚: No powdery peeling occurred;

+○: Some powdery peeling occurred only locally, and the black film remained substantially unchanged in appearance;

○: The powdery peeling of the black film blackened the tape very slightly, but the film remained substantially unchanged in appearance;

−○: The powdery peeling of the black film blackened the tape slightly, and the film was slightly whitened;

Δ: The powdery peeling of the black film blackened the tape, and the film was heavily whitened;

x: The tape was extremely blackened as a result of the complete peeling of the black film.

(6) Light fastness:

The black film on each steel sheet was exposed to light applied by a fadeometer in accordance with the Second Light Exposure Method as specified by JIS L-0842, and its fade resistance was ranked in accordance with the Blue Scale, as follows:

⊚: Grade 7 or 8 of the Blue Scale;

○: Grade 5 or 6;

Δ: Grade 3 or 4;

x: Grade 1 or 2.

EXAMPLE 1 AND COMPARATIVE EXAMPLE 1

Black steel sheets embodying this invention and having black films formed by using different kinds of blackening agents as shown in TABLE 6 and 7 were each evaluated for blackness, weldability, workability, adhesive strength, corrosion resistance, and light fastness. Comparative black steel sheets as shown in TABLE 8 were likewise evaluated for blackness, weldability, and light fastness.

Further information on the steel sheets and the results of their evaluation are shown in TABLES 6 to 11. All of the black films contained 70 parts by weight of blackening agent against 100 parts by weight of base resin, and the different thicknesses of the black films were achieved by employing different roll coating conditions.

Figure 3:
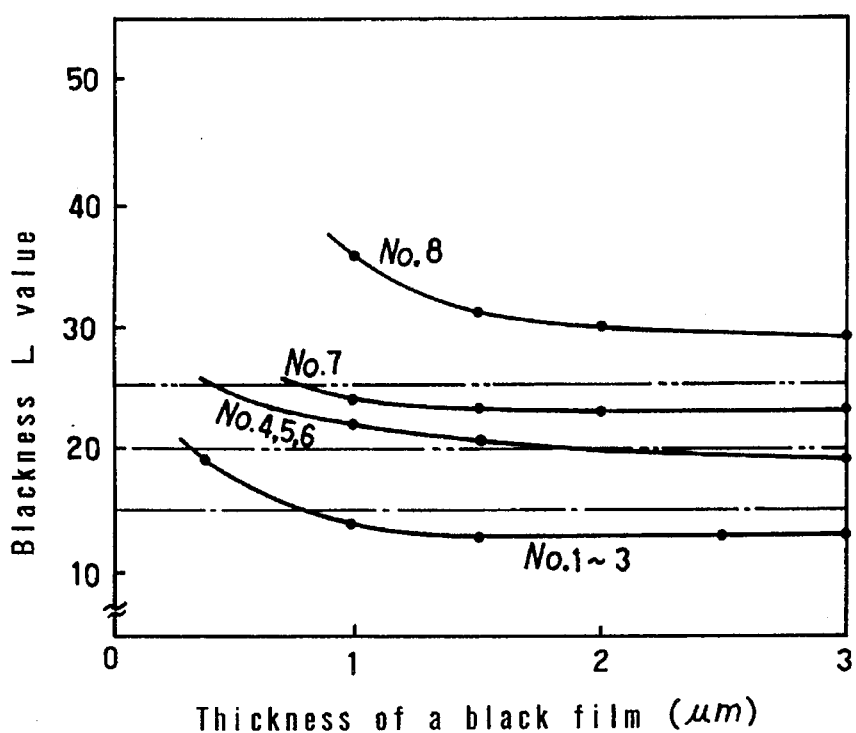
FIG. 3 is a graph showing the blackness of the black film on each sample according to Examples as will hereinafter be described, in relation to its thickness.

FIG. 3 shows the results of the blackness evaluation of each of the steel sheets according to EXAMPLE 1 and COMPARATIVE EXAMPLE 1. As is obvious therefrom, the steel sheets of this invention which had been prepared by using water-soluble black dyes as the blackening agents exhibited the intended blackness, while having black film thicknesses allowing welding. The sheets on which the black films had been formed by employing black azo dyes in the form of complex metal salts showed a particularly high level of blackness.

EXAMPLE 2 AND COMPARATIVE EXAMPLE 2

Black steel sheets embodying this invention and carrying black films formed by using different proportions of a water-soluble black azo dye in the form of a complex metal salt, and having different thicknesses as shown in TABLES 12 to 14 were each evaluated for blackness, weldability, m formability, adhesive strength, corrosion resistance, and light fastness. Comparative black steel sheets as shown in TABLES 15 and 16 were likewise evaluated for blackness and weldability.

Further information on the steel sheets and the results of their evaluation are shown in TABLES 12 to 21. As is obvious therefrom, good blackness was achieved only when the relationship as expressed by the formula $$(x-1)(y-0.2) \geq 7$$

existed between the proportion 'x' of the blackening agent and the thickness 'y' of the black film, and an outstandingly good level of blackness as represented by an L value not exceeding 15 could be obtained when the relationship $$(x-5)(y-0.65) \geq 6$$

existed.

Figure 4:
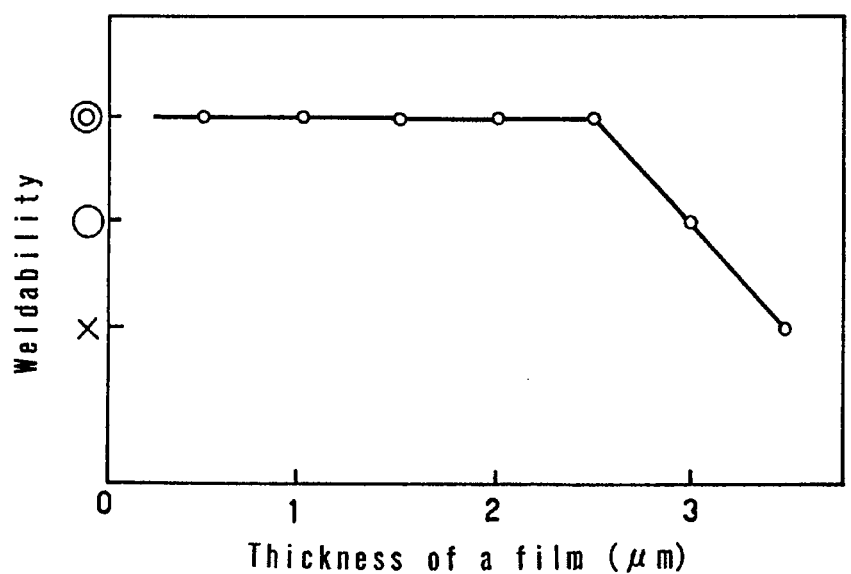
FIG. 4 is a graph showing the weldability of each sample according to Examples in relation to the thickness of the black film formed thereon.

FIG. 4 shows the results of the weldability evaluation of the steel sheets according to EXAMPLES 1 and 2, and COMPARATIVE EXAMPLES 1 and 2. As is obvious therefrom, the steel sheets were found to begin to lower in weldability when their black film thickness exceeded 2.5 microns, and no steel sheet having a black film thickness in excess of three microns was properly weldable.

EXAMPLE 3 AND COMPARATIVE EXAMPLE 3

Black steel sheets embodying this invention, which had been differently plated and chromated, and on which black films differing in composition had been formed, as shown in TABLE 22, were each evaluated for blackness, weldability, formability, corrosion resistance, and light fastness. Comparative black steel sheets as shown in TABLE 23 were likewise evaluated. Further information on the steel sheets and the results of their evaluation are shown in TABLES 22 to 25.

EXAMPLE 4 AND COMPARATIVE EXAMPLE 4

Black steel sheets embodying this invention and having black films differing in composition as shown in TABLE 26 and 27 were each evaluated for blackness, weldability, formability, corrosion resistance, and light fastness. Comparative black steel sheets as shown in TABLE 28 were likewise evaluated. Further information on the steel sheets and the results of their evaluation are shown in TABLES 26 to 31.

EXAMPLE 5 AND COMPARATIVE EXAMPLE 5

A black steel sheet embodying this invention and having a black film formed by using a water-soluble black azo dye in the form of a complex metal salt, and a comparative black steel sheet having a clear film not containing any black azo dye, as shown in TABLE 32, were each evaluated for corrosion resistance, and other properties. Further information on the steel sheets and the results of their evaluation are shown in TABLES 32 and 33. For the sake of further comparison, TABLES 32 and 33 include also Sample No. 3 of COMPARATIVE EXAMPLE 3 having a black film formed on the steel sheet on which no chromate film had been formed.

As is obvious from TABLE 33, the steel sheet embodying this invention (comprising a zinc-plated steel sheet, a chromate film formed thereon and having a coating weight of 50 mg/m$^2$, and a black film formed thereon and having a thickness of 1.5 microns) was superior in corrosion resistance to the comparative steel sheet comprising a zinc-plated steel sheet, a chromate film formed thereon and having a coating weight of 50 mg/m$^2$, and a clear film formed thereon. The superiority in corrosion resistance of the steel sheet embodying this invention is not only due to the barrier effect produced by the chromate film and the resin film, but also due to the facts that the black dye itself forms a passive film, as the molecules of the dye mixed with the resin are uniformly and densely distributed in the black film.

Moreover, it is apparent that the corrosion resistance of the steel sheet embodying this invention does not only owe itself to the black film, but is further enhanced by the interaction of the black film with the underlying chromate film. This is obvious from its comparison with Sample No. 3 of COMPARATIVE EXAMPLE 3 having no chromate film formed thereon. This steel sheet of COMPARATIVE EXAMPLE 3 having a black film formed directly on a zinc-plated steel surface was by far inferior in corrosion resistance to the steel sheet embodying this invention. It is evident that the outstanding high corrosion resistance of the steel sheet embodying this invention was not only due to the barrier effect added to by the chromate film, but was due to the synergistic effect produced by the chromate film and the black film formed thereon.

EXAMPLE 6 AND COMPARATIVE EXAMPLE 6

A chromate film having a coating weight of 50 mg/m$^2$ in terms of chromium was formed by a continuous roll coater on the degreased surface of a steel sheet plated with a Zn—Ni alloy containing 12% Ni. A composition comprising 100 parts by weight of a water-soluble epoxy ester resin (TABLE 2, No. 1) and 70 parts by weight of an acid black azo dye in the form of a complex metal salt (TABLE 3, No. 1) was applied onto the chromate film by the continuous roll coater, and cured by heating at 140° C. to form a black film having a thickness of 1.5 microns, whereby a black steel sheet embodying this invention was prepared.

For the sake of comparison, a steel sheet plated with a Zn-12% Ni alloy and having a degreased surface was dipped for five seconds in a bath for reactive blackening treatment composed of an aqueous solution of nitric acid having a concentration of 5% by weight and a temperature of 25° C., was rinsed with water, and was dried, whereby a black film was formed on the steel sheet.

The comparative steel sheet, however, began to lower its blackness when about 0.03 m$^2$ of its surface per liter of the solution had been blackened, and when about 0.04 m$^2$ of its surface had been treated, the L value as a measure of its blackness exceeded 20, and began to show a sharp increase. On the other hand, continuous treatment was possible for the manufacture of the steel sheet embodying this invention as long as the supply of the film-forming composition could be continued.

After the black steel sheets had been prepared, a part of the remainder of the solution which had been used for forming the black film on the steel sheet embodying this invention was collected from the tray in the roll coater, and a part of the aqueous solution of nitric acid used for blackening the comparative steel sheet was likewise collected. The zinc content of each solution was determined by an apparatus for atomic absorption spectroscopy (Model Z-8000 of Hitachi Limited) as a measure of the amount of zinc eluted from the plating layer. Only a trace, or even a smaller amount of zinc was detected from the solution employed for the purpose of this invention, but the solution used for the comparative purpose was found to contain zinc in the amount indicating the elution of about 5 g of Zn-12Ni alloy per m$^2$ of the treated surface.

The salt spray test as hereinbefore described was conducted for evaluating each black steel sheet obtained for corrosion resistance. The flat tested portion of the steel sheet embodying this invention was free of any white rust when the test lasting for 480 hours was over, but the whole surface of the comparative steel sheet was covered with white rust in about one to two hours.

A chromate film having a coating weight of 50 mg/m² in terms of chromium was formed by coating on the blackened surface of a comparative steel sheet, and a clear film having a thickness of 1.5 microns was formed on the chromate film from the resin shown be No. 1 in Table 2. Then, the salt spray test as hereinbefore described was conducted again on the comparative steel sheet. White rust was found on about 5% by area of the tested surface when the test lasting for 240 hours was over. Thus, it was an improvement in corrosion resistance over the steel sheet having no chromate or resin film formed on its surface. The comparative black steel sheet may also be satisfactory in corrosion resistance as a material for making an electrical appliance for domestic use, but can only be manufactured by a process comprising the steps of forming a black film by reactive blackening treatment on a steel sheet plated with a Zn—Ni alloy, rinsing with water, drying, forming a chromate film and forming a clear resin film, while the black steel sheet of this invention can be manufactured by a process comprising the steps of forming a chromate film on a plated steel sheet, and forming a black film thereon. It is, therefore, another great advantage of the black steel sheet of this invention that it can be manufactured by a simplified process not including any of the steps of reactive blackening treatment, rinsing and drying.

The following symbols, which will appear in many of the tables, have the following meanings:
*1: See TABLE 1,
*2: See TABLE 2,
*3: See TABLE 3,
*4: Parts by weight of the blackening agent for 100 parts by weight of base resin,
*5: See TABLE 4,
*6: Parts by weight of solid lubricant for 100 parts by weight of base resin,
*7: See TABLE 5,
*8: Parts by weight of granular rust-inhibitive pigment for 100 parts by weight of base resin,
*9: (x−1)(y−0.2)
*10: (x−5)(y−0.65)

TABLE 1

| No. | Materials |
|-----|-----------|
| 1 | Electrogalvanized steel |
| 2 | Zn—Ni alloy electroplated steel |
| 3 | Zn—Fe alloy electroplated steel |
| 4 | Hot dip galvanized steel |
| 5 | Zn—SiO$_2$ composite electroplated steel |

TABLE 2

| No. | Base Resin | Designation |
|-----|------------|-------------|
| 1 | Water-soluble epoxy ester | WATERSOLS-168-D: Product of DAINIPPON INK & CHEMICAL CO., LTD |
| 2 | Water-soluble alkyd resin | WATERSOLS-145: Product of DAINIPPON INK & CHEMICAL CO., LTD |
| 3 | Water-dispersible expoxyresin | Dickfine: Product of DAINIPPON INK & CHEMICAL CO., LTD |

TABLE 3

| No. | Blackening agent | Tradename | C.I. Generic Name |
|-----|------------------|-----------|-------------------|
| 1 | Acid dye: Black azo dye composed of a complex metal salt soluble | Kayaset Black K-R (Nippon Kayaku Co., Ltd.) | — |
| 2 | Acid dye: Black azo dye composed of a complex metal salt soluble i | Aizen Spilon Black 1W-Liq. (Hodogaya Chemical Co., Ltd.) | — |
| 3 | Black azo dye composed of a complex metal salt soluble in an organic solvent | Neolan Black WA 200% (CIBA-GEIGY) | C.I. Direct Black 52 |
| 4 | Acid dye: Black azo (disazo) dye | — | C.I. Acid Black 1 |
| 5 | Acid dye: Black azine dye | — | C.I. Acid Black 2 |
| 6 | Black dye: Black mordant dye | Mitsui Chrome Black AC (Mitsui-Toatsu Dyes. Ltd.) | C.I. Mordant Black 1 |
| 7 | Carbon black (inorganic pigment) | Mitsubishi Carbon Black (Mitsubishi Chemical Industories, Ltd.) | — |
| 8 | Aniline Black (organic pigment) | Paliotol Black L0080 (BASF) | C.I. Pigment Black 1 |

TABLE 4

| No. | Solid Lubricant |
|---|---|
| 1 | Polyethylene wax (SANWAX 151-P; Sanyo Chemical Co., Ltd.) |
| 2 | Molybdenum disulfide (MOLYPOWDER C: Nippon Kokuen Kogyo Co., Ltd.) |
| 3 | Polytetrafluoroethylene (HOSTAFLON TF 9202: Hoechst Japan) |

TABLE 5

| No. | Granular Rust-Inhibitive Pigment |
|---|---|
| 1 | Sparingly soluble chromium compound: $BaCrO_4$ (Product of Kikuchi Color Industrial Co., Ltd.) |
| 2 | Sparingly soluble chromium compound: $CaCrO_4$ (Product of Kikuchi Color Industrial Co., Ltd.) |
| 3 | Silica: Ultrafine silica (Product of Nippon Aerozile Co., Ltd.; 200) |
| 4 | Silica: Colloidal silica dispersed in water (Product of Nissan Chemical Industsories, Ltd. Snawlex 20) |

TABLE 6

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| Example 1 | | | | | | | | | | | | | | | |
| 1 | 1 | 20 | coating | 50 | 1 | 1 | 70 | — | — | — | — | 0.4 | 13.8 | — | 140 |
| 2 | 1 | 20 | coating | 50 | 1 | 1 | 70 | — | — | — | — | 1.0 | 55.2 | 22.75 | 140 |
| 3 | 1 | 20 | coating | 50 | 1 | 1 | 70 | — | — | — | — | 1.5 | 89.7 | 55.25 | 140 |
| 4 | 1 | 20 | coating | 50 | 1 | 1 | 70 | — | — | — | — | 2.5 | 158.7 | 120.25 | 140 |
| 5 | 1 | 20 | coating | 50 | 1 | 1 | 70 | — | — | — | — | 3.0 | 193.2 | 152.75 | 140 |
| 6 | 1 | 20 | coating | 50 | 1 | 2 | 70 | — | — | — | — | 0.4 | 13.8 | — | 140 |
| 7 | 1 | 20 | coating | 50 | 1 | 2 | 70 | — | — | — | — | 1.0 | 55.2 | 22.75 | 140 |
| 8 | 1 | 20 | coating | 50 | 1 | 2 | 70 | — | — | — | — | 1.5 | 89.7 | 55.25 | 140 |
| 9 | 1 | 20 | coating | 50 | 1 | 2 | 70 | — | — | — | — | 2.5 | 158.7 | 120.25 | 140 |
| 10 | 1 | 20 | coating | 50 | 1 | 2 | 70 | — | — | — | — | 3.0 | 193.2 | 152.75 | 140 |
| 11 | 1 | 20 | coating | 50 | 1 | 3 | 70 | — | — | — | — | 0.4 | 13.8 | — | 140 |
| 12 | 1 | 20 | coating | 50 | 1 | 3 | 70 | — | — | — | — | 1.0 | 55.2 | 22.75 | 140 |
| 13 | 1 | 20 | coating | 50 | 1 | 3 | 70 | — | — | — | — | 1.5 | 89.7 | 55.25 | 140 |
| 14 | 1 | 20 | coating | 50 | 1 | 3 | 70 | — | — | — | — | 2.5 | 153.7 | 120.25 | 140 |
| 15 | 1 | 20 | coating | 50 | 1 | 3 | 70 | — | — | — | — | 3.0 | 193.2 | 152.75 | 140 |

TABLE 7

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| Example 1 | | | | | | | | | | | | | | | |
| 16 | 1 | 20 | coating | 50 | 1 | 4 | 70 | — | — | — | — | 0.3 | — | — | 140 |
| 17 | 1 | 20 | coating | 50 | 1 | 4 | 70 | — | — | — | — | 1.0 | — | — | 140 |
| 18 | 1 | 20 | coating | 50 | 1 | 4 | 70 | — | — | — | — | 1.5 | — | — | 140 |
| 19 | 1 | 20 | coating | 50 | 1 | 4 | 70 | — | — | — | — | 2.5 | — | — | 140 |
| 20 | 1 | 20 | coating | 50 | 1 | 4 | 70 | — | — | — | — | 3.0 | — | — | 140 |
| 21 | 1 | 20 | coating | 50 | 1 | 5 | 70 | — | — | — | — | 0.4 | — | — | 140 |
| 22 | 1 | 20 | coating | 50 | 1 | 5 | 70 | — | — | — | — | 1.0 | — | — | 140 |
| 23 | 1 | 20 | coating | 50 | 1 | 5 | 70 | — | — | — | — | 1.5 | — | — | 140 |
| 24 | 1 | 20 | coating | 50 | 1 | 5 | 70 | — | — | — | — | 2.5 | — | — | 140 |
| 25 | 1 | 20 | coating | 50 | 1 | 5 | 70 | — | — | — | — | 3.0 | — | — | 140 |
| 26 | 1 | 20 | coating | 50 | 1 | 6 | 70 | — | — | — | — | 0.3 | — | — | 140 |

TABLE 7-continued

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| 27 | 1 | 20 | coating | 50 | 1 | 6 | 70 | — | — | — | — | 1.0 | — | — | 140 |
| 28 | 1 | 20 | coating | 50 | 1 | 6 | 70 | — | — | — | — | 1.5 | — | — | 140 |
| 29 | 1 | 20 | coating | 50 | 1 | 6 | 70 | — | — | — | — | 2.5 | — | — | 140 |
| 30 | 1 | 20 | coating | 50 | 1 | 6 | 70 | — | — | — | — | 3.0 | — | — | 140 |

TABLE 8

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| Comparative Example 1 | | | | | | | | | | | | | | | |
| 1 | 1 | 20 | coating | 50 | 1 | 7 | 70 | — | — | — | — | 1 | — | — | 140 |
| 2 | 1 | 20 | coating | 50 | 1 | 7 | 70 | — | — | — | — | 1.5 | — | — | 140 |
| 3 | 1 | 20 | coating | 50 | 1 | 7 | 70 | — | — | — | — | 2 | — | — | 140 |
| 4 | 1 | 20 | coating | 50 | 1 | 7 | 70 | — | — | — | — | 3 | — | — | 140 |
| 5 | 1 | 20 | coating | 50 | 1 | 8 | 70 | — | — | — | — | 1 | — | — | 140 |
| 6 | 1 | 20 | coating | 50 | 1 | 8 | 70 | — | — | — | — | 1.5 | — | — | 140 |
| 7 | 1 | 20 | coating | 50 | 1 | 8 | 70 | — | — | — | — | 2 | — | — | 140 |
| 8 | 1 | 20 | coating | 50 | 1 | 8 | 70 | — | — | — | — | 3 | — | — | 140 |

TABLE 9

| | Blackness (L value) | Weldability | Formability | Adhesion | Corrosion resistance Flat portion | Corrosion resistance Formed portion | Light fastness |
|---|---|---|---|---|---|---|---|
| Example 1 | | | | | | | |
| 1 | ○ + (19) | ⊙ | ○ | ⊙ | ○ | Δ | ⊙ |
| 2 | ⊙ (14) | ⊙ | ○ | ⊙ | ⊙ | ○- | ⊙ |
| 3 | ⊙ (13) | ⊙ | ○ | ⊙ | ⊙ | ○- | ⊙ |
| 4 | ⊙ (13) | ⊙ | ○ | ⊙ | ⊙ | ○- | ⊙ |
| 5 | ⊙ (13) | ○ | ○ | ⊙ | ⊙ | ○- | ⊙ |
| 6 | ○ + (19) | ⊙ | ○ | ⊙ | ○ | Δ | ⊙ |
| 7 | ⊙ (14) | ⊙ | ○ | ⊙ | ⊙ | ○- | ⊙ |
| 8 | ⊙ (13) | ⊙ | ○ | ⊙ | ⊙ | ○- | ⊙ |
| 9 | ⊙ (13) | ⊙ | ○ | ⊙ | ⊙ | ○- | ⊙ |
| 10 | ⊙ (13) | ○ | ○ | ⊙ | ⊙ | ○- | ⊙ |
| 11 | ○ + (19) | ⊙ | ○ | ⊙ | ○ | Δ | ⊙ |
| 12 | ⊙ (14) | ⊙ | ○ | ⊙ | ⊙ | ○- | ⊙ |
| 13 | ⊙ (13) | ⊙ | ○ | ⊙ | ⊙ | ○- | ⊙ |
| 14 | ⊙ (13) | ⊙ | ○ | ⊙ | ⊙ | ○- | ⊙ |
| 15 | ⊙ (13) | ○ | ○ | ⊙ | ⊙ | ○- | ⊙ |

TABLE 10

| | Blackness (L value) | Weldability | Formability | Adhesion | Corrosion resistance Flat portion | Corrosion resistance Formed portion | Light fastness |
|---|---|---|---|---|---|---|---|
| Example 1 | | | | | | | |
| 16 | ○ (25) | ⊙ | ○ | ⊙ | ○− | △ | ○ |
| 17 | ○ (23) | ⊙ | ○ | ⊙ | ○+ | △ | ○ |
| 18 | ○ (21) | ⊙ | ○ | ⊙ | ○+ | △ | ○ |
| 19 | ○+ (20) | ⊙ | ○ | ⊙ | ○+ | △ | ○ |
| 20 | ○+ (18) | ○ | ○ | ⊙ | ⊙ | △ | ○ |
| 21 | ○ (25) | ⊙ | ○ | ⊙ | ○+ | △ | ○ |
| 22 | ○ (23) | ⊙ | ○ | ⊙ | ○+ | △ | ○ |
| 23 | ○ (21) | ⊙ | ○ | ⊙ | ○+ | △ | ○ |
| 24 | ○+ (20) | ⊙ | ○ | ⊙ | ○+ | △ | ○ |
| 25 | ○+ (18) | ○ | ○ | ⊙ | ⊙ | △ | ○ |
| 26 | ○ (25) | ⊙ | ○ | ⊙ | ○− | △ | △ |
| 27 | ○ (23) | ⊙ | ○ | ⊙ | ○+ | △ | △ |
| 28 | ○ (21) | ⊙ | ○ | ⊙ | ○+ | △ | △ |
| 29 | ○+ (20) | ⊙ | ○ | ⊙ | ○+ | △ | △ |
| 30 | ○+ (18) | ○ | ○ | ⊙ | ⊙ | △ | △ |

TABLE 11

| | Blackness (L value) | Weldability | Formability | Adhesion | Corrosion resistance Flat portion | Corrosion resistance Formed portion | Light fastness |
|---|---|---|---|---|---|---|---|
| Comparative Example 1 | | | | | | | |
| 1 | ○ (24) | ⊙ | — | — | △ | X | ⊙ |
| 2 | ○ (23) | ⊙ | — | — | △ | X | ⊙ |
| 3 | ○ (23) | ⊙ | — | — | △ | X | ⊙ |
| 4 | ○ (23) | ○ | — | — | △ | X | ⊙ |
| 5 | X (36) | ⊙ | — | — | △ | X | ○ ~ △ |
| 6 | X (31) | ⊙ | — | — | △ | X | ○ ~ △ |
| 7 | X (30) | ⊙ | — | — | △ | X | ○ ~ △ |
| 8 | X (29) | ⊙ | — | — | △ | X | ○ ~ △ |

TABLE 12

| | Starting sheet *1 Kind of plating *1 | Starting sheet *1 Coating weight (g/m²) | Chromate film Method of forming | Chromate film Coating weight of chromium (mg/m²) | Black film Base resin *2 | Black film Additive 1 Kind *3 | Black film Additive 1 Proportion (parts) *4 | Black film Additive 2 Kind *5 | Black film Additive 2 Proportion (parts) *6 | Black film Additive 3 Kind *7 | Black film Additive 3 Proportion (parts) *8 | Thickness (μ) | Value of formula ① *9 | Value of formula ①' *10 | Baking temp. (°C.) |
|---|---|---|---|---|---|---|---|---|---|---|---|---|---|---|---|
| Example 2 | | | | | | | | | | | | | | | |
| 1 | 1 | 20 | coating | 50 | 1 | 1 | 4 | — | — | — | — | 2.6 | 7.2 | — | 140 |
| 2 | 1 | 20 | coating | 50 | 1 | 1 | 8 | — | — | — | — | 1.2 | 7.0 | 1.65 | 140 |
| 3 | 1 | 20 | coating | 50 | 1 | 1 | 8 | — | — | — | — | 2.7 | 17.5 | 6.15 | 140 |
| 4 | 1 | 20 | coating | 50 | 1 | 1 | 10 | — | — | — | — | 1.0 | 7.2 | 1.75 | 140 |
| 5 | 1 | 20 | coating | 50 | 1 | 1 | 10 | — | — | — | — | 1.9 | 15.3 | 6.25 | 140 |
| 6 | 1 | 20 | coating | 50 | 1 | 1 | 10 | — | — | — | — | 2.5 | 20.7 | 9.25 | 140 |
| 7 | 1 | 20 | coating | 50 | 1 | 1 | 10 | — | — | — | — | 3.0 | 25.2 | 11.75 | 140 |
| 8 | 1 | 20 | coating | 50 | 1 | 1 | 20 | — | — | — | — | 0.6 | 7.6 | — | 140 |
| 9 | 1 | 20 | coating | 50 | 1 | 1 | 20 | — | — | — | — | 1.1 | 17.1 | 6.75 | 140 |
| 10 | 1 | 20 | coating | 50 | 1 | 1 | 20 | — | — | — | — | 1.5 | 24.7 | 12.75 | 140 |

TABLE 12-continued

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| 11 | 1 | 20 | coating | 50 | 1 | 1 | 20 | — | — | — | — | 2.5 | 43.7 | 27.75 | 140 |
| 12 | 1 | 20 | coating | 50 | 1 | 1 | 20 | — | — | — | — | 3.0 | 53.2 | 35.25 | 140 |

TABLE 13

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| Example 2 | | | | | | | | | | | | | | | |
| 13 | 1 | 20 | coating | 50 | 1 | 1 | 40 | — | — | — | — | 0.4 | 7.8 | — | 140 |
| 14 | 1 | 20 | coating | 50 | 1 | 1 | 40 | — | — | — | — | 0.9 | 27.3 | 8.75 | 140 |
| 15 | 1 | 20 | coating | 50 | 1 | 1 | 40 | — | — | — | — | 1.5 | 50.7 | 29.75 | 140 |
| 16 | 1 | 20 | coating | 50 | 1 | 1 | 40 | — | — | — | — | 2.5 | 89.7 | 64.75 | 140 |
| 17 | 1 | 20 | coating | 50 | 1 | 1 | 40 | — | — | — | — | 3.0 | 109.2 | 82.25 | 140 |
| 18 | 1 | 20 | coating | 50 | 1 | 1 | 80 | — | — | — | — | 0.3 | 7.9 | — | 140 |
| 19 | 1 | 20 | coating | 50 | 1 | 1 | 80 | — | — | — | — | 0.8 | 47.4 | 11.25 | 140 |
| 20 | 1 | 20 | coating | 50 | 1 | 1 | 80 | — | — | — | — | 1.5 | 102.7 | 63.75 | 140 |
| 21 | 1 | 20 | coating | 50 | 1 | 1 | 80 | — | — | — | — | 2.5 | 181.7 | 138.75 | 140 |
| 22 | 1 | 20 | coating | 50 | 1 | 1 | 80 | — | — | — | — | 3.0 | 221.2 | 176.25 | 140 |

TABLE 14

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| Example 2 | | | | | | | | | | | | | | | |
| 23 | 1 | 20 | coating | 50 | 1 | 1 | 120 | — | — | — | — | 0.3 | 11.9 | — | 140 |
| 24 | 1 | 20 | coating | 50 | 1 | 1 | 120 | — | — | — | — | 0.8 | 71.4 | 17.25 | 140 |
| 25 | 1 | 20 | coating | 50 | 1 | 1 | 120 | — | — | — | — | 1.5 | 154.7 | 97.75 | 140 |
| 26 | 1 | 20 | coating | 50 | 1 | 1 | 120 | — | — | — | — | 2.5 | 273.7 | 212.75 | 140 |
| 27 | 1 | 20 | coating | 50 | 1 | 1 | 120 | — | — | — | — | 3.0 | 333.2 | 270.25 | 140 |
| 28 | 1 | 20 | coating | 50 | 1 | 1 | 200 | — | — | — | — | 0.3 | 19.9 | — | 140 |
| 29 | 1 | 20 | coating | 50 | 1 | 1 | 200 | — | — | — | — | 0.7 | 99.5 | 9.75 | 140 |
| 30 | 1 | 20 | coating | 50 | 1 | 1 | 200 | — | — | — | — | 1.5 | 258.7 | 166.75 | 140 |
| 31 | 1 | 20 | coating | 50 | 1 | 1 | 200 | — | — | — | — | 2.5 | 457.7 | 360.75 | 140 |
| 32 | 1 | 20 | coating | 50 | 1 | 1 | 200 | — | — | — | — | 3.0 | 557.2 | 458.25 | 140 |

TABLE 15

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| Comparative Example 2 | | | | | | | | | | | | | | | |
| 1 | 1 | 20 | coating | 50 | 1 | 1 | 3 | — | — | — | — | 3.0 | 5.6 | — | 140 |
| 2 | 1 | 20 | coating | 50 | 1 | 1 | 4 | — | — | — | — | 2.4 | 6.6 | — | 140 |
| 3 | 1 | 20 | coating | 50 | 1 | 1 | 8 | — | — | — | — | 1.1 | 6.3 | 1.35 | 140 |
| 4 | 1 | 20 | coating | 50 | 1 | 1 | 8 | — | — | — | — | 3.5 | 23.1 | 8.55 | 140 |
| 5 | 1 | 20 | coating | 50 | 1 | 1 | 10 | — | — | — | — | 0.9 | 6.3 | 1.25 | 140 |
| 6 | 1 | 20 | coating | 50 | 1 | 1 | 10 | — | — | — | — | 3.5 | 29.7 | 14.25 | 140 |
| 7 | 1 | 20 | coating | 50 | 1 | 1 | 20 | — | — | — | — | 0.5 | 5.7 | — | 140 |
| 8 | 1 | 20 | coating | 50 | 1 | 1 | 20 | — | — | — | — | 3.5 | 62.7 | 42.75 | 140 |

TABLE 16

| | Starting sheet *1 | | Chromate film | | Black film | | | | | | | | | | |
|---|---|---|---|---|---|---|---|---|---|---|---|---|---|---|---|
| | Kind of plating *1 | Coating weight (g/m²) | Method of forming | Coating weight of chromium (mg/m²) | Base resin *2 | Additive 1 Kind *3 | Additive 1 Proportion (parts) *4 | Additive 2 Kind *5 | Additive 2 Proportion (parts) *6 | Additive 3 Kind *7 | Additive 3 Proportion (parts) *8 | Thickness (μ) | Value of formula ① *9 | Value of formula ①' *10 | Baking temp. (°C.) |
| Comparative Example 2 | | | | | | | | | | | | | | | |
| 9 | 1 | 20 | coating | 50 | 1 | 1 | 40 | — | — | — | — | 0.3 | 3.9 | — | 140 |
| 10 | 1 | 20 | coating | 50 | 1 | 1 | 40 | — | — | — | — | 3.5 | 128.7 | 99.75 | 140 |
| 11 | 1 | 20 | coating | 50 | 1 | 1 | 80 | — | — | — | — | 0.2 | — | — | 140 |
| 12 | 1 | 20 | coating | 50 | 1 | 1 | 80 | — | — | — | — | 3.5 | 260.7 | 213.75 | 140 |
| 13 | 1 | 20 | coating | 50 | 1 | 1 | 120 | — | — | — | — | 0.2 | — | — | 140 |
| 14 | 1 | 20 | coating | 50 | 1 | 1 | 120 | — | — | — | — | 3.5 | 379.5 | 327.75 | 140 |
| 15 | 1 | 20 | coating | 50 | 1 | 1 | 200 | — | — | — | — | 0.2 | — | — | 140 |
| 16 | 1 | 20 | coating | 50 | 1 | 1 | 200 | — | — | — | — | 3.5 | 643.5 | 555.75 | 140 |

TABLE 17

| | Blackness (L value) | Weldability | Formability | Adhesion | Corrosion resistance Flat portion | Corrosion resistance Formed portion | Light fastness |
|---|---|---|---|---|---|---|---|
| Example 2 | | | | | | | |
| 1 | ○ + (20) | ○ | ○ | ⊙ | ⊙ | ○− | ⊙ |
| 2 | ○ + (20) | ⊙ | ○ | ⊙ | ⊙ | ○− | ⊙ |
| 3 | ⊙ (15) | ○ | ○ | ⊙ | ⊙ | ○− | ⊙ |
| 4 | ○ + (20) | ⊙ | ⊙ | ⊙ | ⊙ | ○− | ⊙ |
| 5 | ⊙ (15) | ⊙ | ⊙ | ⊙ | ⊙ | ○− | ⊙ |
| 6 | ⊙ (15) | ⊙ | ○ | ⊙ | ⊙ | ○− | ⊙ |
| 7 | ⊙ (15) | ○ | ○ | ⊙ | ⊙ | ○− | ⊙ |
| 8 | ○ + (20) | ⊙ | ○ | ⊙ | +○ | ○− | ⊙ |
| 9 | ⊙ (15) | ⊙ | ○ | ⊙ | ⊙ | ○− | ⊙ |

TABLE 17-continued

| | Blackness | | Weldability | Formability | Adhesion | Corrosion resistance | | Light fastness |
|---|---|---|---|---|---|---|---|---|
| | (L value) | | | | | Flat portion | Formed portion | |
| 10 | ◉ | (14) | ◉ | ○ | ◉ | ◉ | ○− | ◉ |
| 11 | ◉ | (14) | ◉ | ○ | ◉ | ◉ | ○− | ◉ |
| 12 | ◉ | (14) | ○ | ○ | ◉ | ◉ | ○− | ◉ |

10

TABLE 18

| | Blackness | | Weldability | Formability | Adhesion | Corrosion resistance | | Light fastness |
|---|---|---|---|---|---|---|---|---|
| | (L value) | | | | | Flat portion | Formed portion | |
| Example 2 | | | | | | | | |
| 13 | ○+ | (20) | ◉ | ○ | ◉ | ○ | Δ | ◉ |
| 14 | ◉ | (15) | ◉ | ○ | ◉ | +○ | ○− | ◉ |
| 15 | ◉ | (14) | ◉ | ○ | ◉ | ◉ | ○− | ◉ |
| 16 | ◉ | (13) | ◉ | ○ | ◉ | ◉ | ○− | ◉ |
| 17 | ◉ | (13) | ○ | ○ | ◉ | ◉ | ○− | ◉ |
| 18 | ○+ | (20) | ◉ | ○ | ◉ | ○ | Δ | ◉ |
| 19 | ◉ | (15) | ◉ | ○ | ◉ | +○ | ○− | ◉ |
| 20 | ◉ | (13) | ◉ | ○ | ◉ | ◉ | ○− | ◉ |
| 21 | ◉ | (13) | ◉ | ○ | ◉ | ◉ | ○− | ◉ |
| 22 | ◉ | (13) | ○ | ○ | ◉ | ◉ | ○− | ◉ |

TABLE 19

| | Blackness | | Weldability | Formability | Adhesion | Corrosion resistance | | Light fastness |
|---|---|---|---|---|---|---|---|---|
| | (L value) | | | | | Flat portion | Formed portion | |
| Example 2 | | | | | | | | |
| 23 | ○+ | (20) | ◉ | ○ | ◉ | ○ | Δ | ◉ |
| 24 | ◉ | (15) | ◉ | ○ | ◉ | +○ | ○− | ◉ |
| 25 | ◉ | (13) | ◉ | ○ | ◉ | ◉ | ○− | ◉ |
| 26 | ◉ | (13) | ◉ | ○ | ◉ | ◉ | ○− | ◉ |
| 27 | ◉ | (13) | ○ | ○ | ◉ | ◉ | ○− | ◉ |
| 28 | ○+ | (20) | ◉ | −○ | ◉ | ○ | Δ | ◉ |
| 29 | ◉ | (15) | ◉ | −○ | ◉ | +○ | ○− | ◉ |
| 30 | ◉ | (13) | ◉ | −○ | ◉ | ◉ | ○− | ◉ |
| 31 | ◉ | (13) | ◉ | −○ | ◉ | ◉ | ○− | ◉ |
| 32 | ◉ | (13) | ○ | −○ | ◉ | ◉ | ○− | ◉ |

TABLE 20

| Comparative Example 2 | Blackness (L value) | Weldability | Remarks |
|---|---|---|---|
| 1 | ○ (23) | ○ | The surface was uneven in appearance. |
| 2 | ○ (21) | ⊙ | The surface was uneven in appearance. |
| 3 | ○ (22) | ⊙ | The surface was uneven in appearance. |
| 4 | ⊙ (13) | X | — |
| 5 | ○ (22) | ⊙ | The surface was uneven in appearance. |
| 6 | ⊙ (13) | X | — |
| 7 | ○ (22) | ⊙ | The surface was uneven in appearance. |
| 8 | ⊙ (13) | X | — |

TABLE 21

| Comparative Example 2 | Blackness (L value) | Weldability | Remark |
|---|---|---|---|
| 9 | ○ (22) | ⊙ | The surface was uneven in appearance. |
| 10 | ⊙ (13) | X | — |
| 11 | ○ (22) | ⊙ | The surface was uneven in appearance. |
| 12 | ⊙ (13) | X | — |
| 13 | ○ (22) | ⊙ | The surface was uneven in appearance. |
| 14 | ⊙ (13) | X | — |
| 15 | ○ (21) | ⊙ | The surface was uneven in appearance. |
| 16 | ⊙ (13) | X | — |

TABLE 22

| | Starting sheet *1 | | Chromate film | | Black film | | | | | | | | | | |
|---|---|---|---|---|---|---|---|---|---|---|---|---|---|---|---|
| | | | | Coating weight of chromium (mg/m²) | | Additive 1 | | Additive 2 | | Additive 3 | | | | | |
| | Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Example 3 | | | | | | | | | | | | | | | |
| 1 | 1 | 20 | coating | 10 | 1 | 1 | 70 | — | — | — | — | 1.5 | 89.7 | 55.25 | 140 |
| 2 | 1 | 20 | coating | 30 | 1 | 1 | 70 | — | — | — | — | 1.5 | 89.7 | 55.25 | 140 |
| 3 | 1 | 20 | coating | 150 | 1 | 1 | 70 | — | — | — | — | 1.5 | 89.7 | 55.25 | 140 |
| 4 | 1 | 20 | coating | 200 | 1 | 1 | 70 | — | — | — | — | 1.5 | 89.7 | 55.25 | 140 |
| 5 | 1 | 20 | Electrolysis | 50 | 1 | 1 | 70 | — | — | — | — | 1.5 | 89.7 | 55.25 | 140 |
| 6 | 1 | 20 | coating | 50 | 2 | 1 | 70 | — | — | — | — | 1.5 | 89.7 | 55.25 | 140 |
| 7 | 1 | 20 | coating | 50 | 3 | 1 | 70 | — | — | — | — | 1.5 | 89.7 | 55.25 | 140 |
| 8 | 1 | 20 | coating | 50 | 1 | 1 | 70 | — | — | — | — | 1.5 | 89.7 | 55.25 | 80 |
| 9 | 1 | 20 | coating | 50 | 1 | 1 | 70 | — | — | — | — | 1.5 | 89.7 | 55.25 | 120 |
| 10 | 1 | 20 | coating | 50 | 1 | 1 | 70 | — | — | — | — | 1.5 | 89.7 | 55.25 | 250 |
| 11 | 1 | 20 | coating | 50 | 1 | 1 | 70 | — | — | — | — | 1.5 | 89.7 | 55.25 | 300 |
| 12 | 2 | 20 | coating | 50 | 1 | 1 | 70 | — | — | — | — | 1.5 | 89.7 | 55.25 | 140 |
| 13 | 3 | 40 | coating | 50 | 1 | 1 | 70 | — | — | — | — | 1.5 | 89.7 | 55.25 | 140 |
| 14 | 4 | 90 | coating | 50 | 1 | 1 | 70 | — | — | — | — | 1.5 | 89.7 | 55.25 | 140 |
| 15 | 5 | 20 | coating | 50 | 1 | 1 | 70 | — | — | — | — | 1.5 | 89.7 | 55.25 | 140 |

TABLE 23

| Starting sheet *1 | | Chromate film | | Black film | | | | | | | | | | |
|---|---|---|---|---|---|---|---|---|---|---|---|---|---|---|
| | | | Coating weight of chromium (mg/m²) | | Additive 1 | | Additive 2 | | Additive 3 | | | | | |
| Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Comparative Example 3 | | | | | | | | | | | | | | |
| 1 | 1 | 20 | coating | 5 | 1 | 1 | 70 | — | — | — | — | 1.5 | 89.7 | 55.25 | 140 |
| 2 | 1 | 20 | coating | 500 | 1 | 1 | 70 | — | — | — | — | 1.5 | 89.7 | 55.25 | 140 |
| 3 | 1 | 20 | coating | — | 1 | 1 | 70 | — | — | — | — | 1.5 | 89.7 | 55.25 | 140 |

TABLE 24

| | Blackness (L value) | Weldability | Formability | Adhesion | Corrosion resistance | | Light fastness |
|---|---|---|---|---|---|---|---|
| | | | | | Flat portion | Formed portion | |
| Example 3 | | | | | | | |
| 1 | ⊚ (13) | ⊚ | ○ | ⊚ | ○ | Δ | ⊚ |
| 2 | ⊚ (13) | ⊚ | ○ | ⊚ | ⊚ | ○− | ⊚ |
| 3 | ⊚ (13) | ⊚ | ○ | ⊚ | ⊚ | ○ | ⊚ |
| 4 | ⊚ (13) | ○ | −○ | ⊚ | ⊚ | ○+ | ⊚ |
| 5 | ⊚ (13) | ⊚ | ○ | ⊚ | ⊚ | ○− | ⊚ |
| 6 | ⊚ (13) | ⊚ | ○ | ⊚ | ⊚ | ○− | ⊚ |
| 7 | ⊚ (13) | ⊚ | ○ | ⊚ | ⊚ | ○− | ⊚ |
| 8 | ⊚ (13) | ⊚ | ○ | ⊚ | ○ | ○− | ⊚ |
| 9 | ⊚ (13) | ⊚ | ○ | ⊚ | ⊚ | ○− | ⊚ |
| 10 | ⊚ (13) | ⊚ | ○ | ⊚ | ⊚ | ○− | ⊚ |
| 11 | ⊚ (13) | ⊚ | −○ | ⊚ | ○ | ○− | ⊚ |
| 12 | ⊚ (13) | ⊚ | +○ | ⊚ | ⊚ | ○ | ⊚ |
| 13 | ⊚ (13) | ⊚ | +○ | ⊚ | ⊚ | ○ | ⊚ |
| 14 | ⊚ (13) | ⊚ | −○ | ⊚ | ⊚ | ○ | ⊚ |
| 15 | ⊚ (13) | ⊚ | ○ | ⊚ | ⊚ | ○ | ⊚ |

TABLE 25

|  | Blackness (L value) | Weldability | Formability | Adhesion | Corrosion resistance Flat portion | Corrosion resistance Formed portion | Light fastness |
|---|---|---|---|---|---|---|---|
| Comparative Example 3 |  |  |  |  |  |  |  |
| 1 | ⊙ (13) | ⊙ | ⊙ | ○ | △ | X | ⊙ |
| 2 | ⊙ (13) | △~X | △ | △ | ⊙ | ○+ | ⊙ |
| 3 | ⊙ (13) | ⊙ | ⊙ | ○ | X | X | ⊙ |

TABLE 26

| | Starting sheet *1 Kind of plating *1 | Starting sheet *1 Coating weight (g/m²) | Chromate film Method of forming | Chromate film Coating weight of chromium (mg/m²) | Black film Base resin *2 | Black film Additive 1 Kind *3 | Black film Additive 1 Proportion (parts) *4 | Black film Additive 2 Kind *5 | Black film Additive 2 Proportion (parts) *6 | Black film Additive 3 Kind *7 | Black film Additive 3 Proportion (parts) *8 | Thickness (μ) | Value of formula ① *9 | Value of formula ①' *10 | Baking temp. (°C.) |
|---|---|---|---|---|---|---|---|---|---|---|---|---|---|---|---|
| Example 4 | | | | | | | | | | | | | | | |
| 1 | 1 | 20 | coating | 50 | 1 | 1 | 70 | 1 | 1 | — | — | 1.5 | 89.7 | 55.25 | 140 |
| 2 | 1 | 20 | coating | 50 | 1 | 1 | 70 | 1 | 3 | — | — | 1.5 | 89.7 | 55.25 | 140 |
| 3 | 1 | 20 | coating | 50 | 1 | 1 | 70 | 1 | 20 | — | — | 1.5 | 89.7 | 55.25 | 140 |
| 4 | 1 | 20 | coating | 50 | 1 | 1 | 100 | 1 | 60 | — | — | 1.5 | 89.7 | 55.25 | 140 |
| 5 | 1 | 20 | coating | 50 | 1 | 1 | 120 | 1 | 100 | — | — | 1.5 | 89.7 | 55.25 | 140 |
| 6 | 1 | 20 | coating | 50 | 1 | 1 | 120 | 2 | 20 | — | — | 1.5 | 89.7 | 55.25 | 140 |
| 7 | 1 | 20 | coating | 50 | 1 | 1 | 120 | 3 | 20 | — | — | 1.5 | 89.7 | 55.25 | 140 |
| 8 | 1 | 20 | coating | 50 | 1 | 1 | 120 | — | — | 1 | 1 | 1.5 | 89.7 | 55.25 | 140 |
| 9 | 1 | 20 | coating | 50 | 1 | 1 | 120 | — | — | 1 | 3 | 1.5 | 89.7 | 55.25 | 140 |
| 10 | 1 | 20 | coating | 50 | 1 | 1 | 100 | — | — | 1 | 60 | 1.5 | 89.7 | 55.25 | 140 |
| 11 | 1 | 20 | coating | 50 | 1 | 1 | 120 | — | — | 1 | 100 | 1.5 | 89.7 | 55.25 | 140 |

TABLE 27

| | Starting sheet *1 Kind of plating *1 | Starting sheet *1 Coating weight (g/m²) | Chromate film Method of forming | Chromate film Coating weight of chromium (mg/m²) | Black film Base resin *2 | Black film Additive 1 Kind *3 | Black film Additive 1 Proportion (parts) *4 | Black film Additive 2 Kind *5 | Black film Additive 2 Proportion (parts) *6 | Black film Additive 3 Kind *7 | Black film Additive 3 Proportion (parts) *8 | Thickness (μ) | Value of formula ① *9 | Value of formula ①' *10 | Baking temp. (°C.) |
|---|---|---|---|---|---|---|---|---|---|---|---|---|---|---|---|
| Example 4 | | | | | | | | | | | | | | | |
| 12 | 1 | 20 | coating | 50 | 1 | 1 | 70 | — | — | 2 | 20 | 1.5 | 89.7 | 55.25 | 140 |
| 13 | 1 | 20 | coating | 50 | 1 | 1 | 70 | — | — | 3 | 20 | 1.5 | 89.7 | 55.25 | 140 |
| 14 | 1 | 20 | coating | 50 | 1 | 1 | 70 | — | — | 4 | 20 | 1.5 | 89.7 | 55.25 | 140 |
| 15 | 1 | 20 | coating | 50 | 1 | 1 | 70 | 1 | 20 | 1 | 1 | 1.5 | 89.7 | 55.25 | 140 |
| 16 | 1 | 20 | coating | 50 | 1 | 1 | 70 | 1 | 20 | 1 | 3 | 1.5 | 89.7 | 55.25 | 140 |
| 17 | 1 | 20 | coating | 50 | 1 | 1 | 70 | 1 | 20 | 1 | 20 | 1.5 | 89.7 | 55.25 | 140 |
| 18 | 1 | 20 | coating | 50 | 1 | 1 | 150 | 1 | 20 | 1 | 60 | 1.5 | 89.7 | 55.25 | 140 |
| 19 | 1 | 20 | coating | 50 | 1 | 1 | 150 | 1 | 20 | 1 | 100 | 1.5 | 89.7 | 55.25 | 140 |
| 20 | 1 | 20 | coating | 50 | 1 | 1 | 150 | 1 | 1 | 1 | 20 | 1.5 | 89.7 | 55.25 | 140 |
| 21 | 1 | 20 | coating | 50 | 1 | 1 | 150 | 1 | 3 | 1 | 20 | 1.5 | 89.7 | 55.25 | 140 |
| 22 | 1 | 20 | coating | 50 | 1 | 1 | 150 | 1 | 60 | 1 | 20 | 1.5 | 89.7 | 55.25 | 140 |
| 23 | 1 | 20 | coating | 50 | 1 | 1 | 150 | 1 | 100 | 1 | 20 | 1.5 | 89.7 | 55.25 | 140 |

TABLE 28

| Starting sheet *1 | | Chromate film | | Black film | | | | | | | | | |
|---|---|---|---|---|---|---|---|---|---|---|---|---|---|
| | | | Coating weight of chromium (mg/m²) | | Additive 1 | | Additive 2 | | Additive 3 | | | | |
| Kind of plating *1 | Coating weight (g/m²) | Method of forming | | Base resin *2 | Kind *3 | Proportion (parts) *4 | Kind *5 | Proportion (parts) *6 | Kind *7 | Proportion (parts) *8 | Thickness (μ) | Value of formula ① *9 | Value of formula ①' *10 | Baking temp. (°C.) |
| Comparative Example 4 | | | | | | | | | | | | | | |
| 1 | 1 | 20 | coating | 50 | 1 | 1 | 70 | 1 | 150 | — | — | 1.5 | — | — | 140 |
| 2 | 1 | 20 | coating | 50 | 1 | 1 | 70 | — | — | 1 | 150 | 1.5 | — | — | 140 |
| 3 | 1 | 20 | coating | 50 | 1 | 1 | 70 | 1 | 40 | 1 | 110 | 1.5 | — | — | 140 |
| 4 | 1 | 20 | coating | 50 | 1 | 1 | 70 | 1 | 110 | 1 | 40 | 1.5 | — | — | 140 |

TABLE 29

| | Blackness (L value) | Weldability | Formability | Adhesion | Corrosion resistance | | Light fastness |
|---|---|---|---|---|---|---|---|
| | | | | | Flat portion | Formed portion | |
| Example 4 | | | | | | | |
| 1 | ⊙ (13) | ⊙ | +○ | ⊙ | ⊙ | ○− | ⊙ |
| 2 | ⊙ (13) | ⊙ | ⊙ | ⊙ | ⊙ | ○− | ⊙ |
| 3 | ⊙ (14) | ⊙ | ⊙ | ⊙ | ⊙ | ○− | ⊙ |
| 4 | ⊙ (15) | ⊙ | ⊙ | ⊙ | ⊙ | ○− | ⊙ |
| 5 | ○ + (20) | ⊙ | +○ | ○ | ○+ | ○− | ⊙ |
| 6 | ⊙ (14) | ⊙ | ⊙ | ⊙ | ⊙ | ○− | ⊙ |
| 7 | ⊙ (14) | ⊙ | ⊙ | ⊙ | ⊙ | ○− | ⊙ |
| 8 | ⊙ (13) | ⊙ | ○ | ⊙ | ⊙ | ○ | ⊙ |
| 9 | ⊙ (13) | ⊙ | ○ | ⊙ | ⊙ | ○+ | ⊙ |
| 10 | ⊙ (15) | ⊙ | ○ | ○ | ⊙ | ○+ | ⊙ |
| 11 | ○ + (20) | ⊙ | −○ | ○ | ⊙ | ○+ | ⊙ |

TABLE 30

| | Blackness (L value) | Weldability | Formability | Adhesion | Corrosion resistance | | Light fastness |
|---|---|---|---|---|---|---|---|
| | | | | | Flat portion | Formed portion | |
| Example 4 | | | | | | | |
| 12 | ⊙ (14) | ⊙ | ○ | ⊙ | ⊙ | ○+ | ⊙ |
| 13 | ⊙ (14) | ⊙ | ○ | ⊙ | ⊙ | ○+ | ⊙ |
| 14 | ⊙ (14) | ⊙ | ○ | ⊙ | ⊙ | ○+ | ⊙ |
| 15 | ⊙ (14) | ⊙ | +○ | ⊙ | ⊙ | ○ | ⊙ |
| 16 | ⊙ (14) | ⊙ | ⊙ | ⊙ | ⊙ | ○+ | ⊙ |
| 17 | ⊙ (15) | ⊙ | ⊙ | ⊙ | ⊙ | ○+ | ⊙ |
| 18 | ○ + (18) | ⊙ | +○ | ○ | ⊙ | ○+ | ⊙ |
| 19 | ○ + (20) | ⊙ | +○ | ○ | ⊙ | ○+ | ⊙ |
| 20 | ⊙ (13) | ⊙ | +○ | ⊙ | ⊙ | ○+ | ⊙ |
| 21 | ⊙ (13) | ⊙ | ⊙ | ⊙ | ⊙ | ○+ | ⊙ |
| 22 | ○ + (18) | ⊙ | +○ | ○ | ⊙ | ○+ | ⊙ |
| 23 | ○ + (20) | ⊙ | +○ | ○ | ⊙ | ○ | ⊙ |

TABLE 31

|  | Blackness (L value) | Weldability | Formability | Adhesion | Corrosion resistance Flat portion | Corrosion resistance Formed portion | Light fastness |
|---|---|---|---|---|---|---|---|
| Comparative Example 4 |  |  |  |  |  |  |  |
| 1 | X (26) | ⊚ | –○ | Δ | ⊚ | X | ⊚ |
| 2 | X (26) | ⊚ | Δ | Δ | ⊚ | Δ | ⊚ |
| 3 | X (26) | ⊚ | Δ | Δ | ⊚ | Δ | ⊚ |
| 4 | X (26) | ⊚ | Δ | Δ | ⊚ | X | ⊚ |

TABLE 32

| | Starting sheet *1 Kind of plating *1 | Starting sheet *1 Coating weight (g/m²) | Chromate film Method of forming | Chromate film Coating weight of chromium (mg/m²) | Black film Base resin *2 | Black film Additive 1 Kind *3 | Black film Additive 1 Proportion (parts) *4 | Black film Additive 2 Kind *5 | Black film Additive 2 Proportion (parts) *6 | Black film Additive 3 Kind *7 | Black film Additive 3 Proportion (parts) *8 | Thickness (μ) | Value of formula ① *9 | Value of formula ①' *10 | Baking temp. (°C.) |
|---|---|---|---|---|---|---|---|---|---|---|---|---|---|---|---|
| Example 5 | 1 | 20 | coating | 50 | 1 | 1 | 70 | — | — | — | — | 1.5 | 89.7 | 52.5 | 140 |
| Comparative Example (5) | 1 | 20 | coating | 50 | 1 | — | — | — | — | — | — | 1.5 | — | — | 140 |
| Comparative Example (3) No. 3 | 1 | 20 | — | — | 1 | 1 | 70 | — | — | — | — | 1.5 | 89.7 | 55.25 | 140 |

TABLE 33

|  | Blackness (L value) | Weldability | Formability | Adhesion | Corrosion resistance Flat portion | Corrosion resistance Formed portion | Light fastness |
|---|---|---|---|---|---|---|---|
| Example 5 | ⊚ (13) | ⊚ | ○ | ⊚ | ⊚ | ○– | ⊚ |
| Comparative Example 5 | X (65) | ⊚ | ○ | ⊚ | ⊚ | X | — |
| Comparative Example 3 No. 3 | ⊚ (13) | ⊚ | ⊚ | ○ | X | X | ⊚ |

What is claimed is:

1. A weldable black steel sheet having a surface plated with zinc or zinc alloy, and carrying a chromate film formed on said plated surface and having a coating weight of 10 to 200 mg/m² in terms of metallic chromium, and a black film formed on said chromate film from a composition comprising 100 parts by weight of a water-soluble or water-dispersible thermosetting resin as a base resin, and 'x' parts by weight of a black metal complex of azo dye having at least one hydroxyl group per molecule as a blackening agent, said black film having a thickness of 'y' microns, and 'x' being a value satisfying formulas 1 and 2, while said 'y' is a vlaue satisfying formulas 1 and 3:

$$(x-1)(y-0.2) \geq 7 \quad (1)$$

$$1 < x \leq 200 \quad (2)$$

$$0.2 < y \leq 3 \quad (3)$$

where 'x' represents the proportion, in parts by weight, of said dye aganinst 100 parts by weight of said resin, and 'y' represents the thickness, in microns, of said black film.

2. A weldable black steel sheet as set forth in claim 1, wherein said composition further contains 1 to 100 parts by weight of a solid lubricant.

3. A weldable black steel sheet as set forth in claim 1, wherein said composition further contains 1 to 100 parts by weight of a granular rust-inhibitive pigment.

4. A weldable black steel sheet as set forth in claim 1, wherein said composition further contains 1 to 100 parts by weight of a solid lubricant and 1 to 100 parts by weight of a granular rust-inhibitive pigment.

5. A weldable black steel sheet as set forth in any of claims 1 to 4, wherein said 'x' is a value satisfying formulas 1' and 2', while said 'y' is a value satisfying formulas 1' and 3':

$$(x-5)(y-0.65) \geqq 6 \qquad (1')$$

$$5 < x \leqq 120 \qquad (2')$$

$$0.65 < y \leqq 2.5 \qquad (3')$$

where 'x' and 'y' are both as defined in claim 1.

6. A weldable black steel sheet as set forth in any of claims 2 or 4, wherein said lubricant is at least one material selected from the group consisting of polyolefin wax, paraffin wax, fluororesin compounds, fatty acid amides, metallic soaps, molybdenum disulfide, graphite, graphite fluoride, boron nitride, and polyalkylene glycols.

7. A weldable black steel sheet as set forth in any of claims 3 or 4, wherein said pigment is at least one material selected from the group consisting of sparingly soluble chromium compounds and silica.

8. A weldable black steel sheet as set forth in claim 5, wherein said lubricant is at least one material selected from the group consisting of polyolefin wax, paraffin wax, fluororesin compounds, fatty acid amides, metallic soaps, molybdenum disulfide, graphite, graphite fluoride, boron nitride, and polyalkylene glycols.

9. A weldable black steel sheet as set forth in claim 5, wherein said pigment is at least one material selected from the group consisting of sparingly soluble chromium compounds and silica.

10. A weldable black steel sheet as set forth in claim 6, wherein said pigment is at least one material selected from the group consisting of sparingly soluble chromium compounds and silica.

\* \* \* \* \*